United States Patent
Malani et al.

(10) Patent No.: US 12,359,950 B2
(45) Date of Patent: Jul. 15, 2025

(54) POLYMER-BASED CORIOLIS MASS FLOW SENSOR FABRICATED THROUGH CASTING

(71) Applicant: Malema Engineering Corporation, Boca Raton, FL (US)

(72) Inventors: Deepak Bhagwan Malani, Boca Raton, FL (US); Jayasekar Rajagopalan, Cupertino, CA (US); Claus Waldersdorff Knudsen, Fremont, CA (US); Peter Anthony McCann, Madera, CA (US); Vinh T. Nguyen, San Jose, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 11 days.

(21) Appl. No.: 18/168,345

(22) Filed: Feb. 13, 2023

(65) Prior Publication Data

US 2023/0194321 A1 Jun. 22, 2023

Related U.S. Application Data

(63) Continuation of application No. 16/837,635, filed on Apr. 1, 2020, now Pat. No. 11,585,687.
(Continued)

(51) Int. Cl.
*G01F 1/84* (2006.01)
*G01D 11/30* (2006.01)
(Continued)

(52) U.S. Cl.
CPC ........... *G01F 1/8409* (2013.01); *G01D 11/30* (2013.01); *G01F 1/6965* (2013.01); *G01F 15/022* (2013.01)

(58) Field of Classification Search
CPC .................................................... G01F 1/8409
(Continued)

(56) References Cited

U.S. PATENT DOCUMENTS

| 6,383,423 B1 | 5/2002 | Kurokawa et al. |
| 6,776,053 B2 | 8/2004 | Schlosser et al. |

(Continued)

FOREIGN PATENT DOCUMENTS

| CN | 206989514 U | 2/2018 |
| CN | 113543921 A | 10/2021 |

(Continued)

OTHER PUBLICATIONS

International Search Report and Written Opinion in International Appln. No. PCT/US2020/026258, mailed on Jun. 29, 2020, 12 pages.
(Continued)

*Primary Examiner* — Walter L Lindsay, Jr.
*Assistant Examiner* — Philip T Fadul
(74) *Attorney, Agent, or Firm* — Fish & Richardson P.C.

(57) ABSTRACT

A flow sensor includes a flow tube in a form of a tube and a support cast around the flow tube. The support clamps the flow tube and the flow tube extends through the support. The flow sensor is formed by placing the flow tube in a tube cavity of a casting mold and pouring or injecting a liquid resin into a support cavity of the casting mold. The support is formed around the flow tube from solidifying the liquid resin in the support cavity of the casting mold. A temperature of the casting mold during formation of the support does not exceed a threshold temperature to avoid deformation of the flow tube. The flow sensor can also include at least one memory chip that stores calibration information associated with the flow sensor and connectors that allows a controller to read the calibration information from the memory chip.

25 Claims, 18 Drawing Sheets

Related U.S. Application Data

(60) Provisional application No. 62/828,332, filed on Apr. 2, 2019.

(51) Int. Cl.
  *G01F 1/696* (2006.01)
  *G01F 15/02* (2006.01)

(58) Field of Classification Search
  USPC .................................................. 73/861.354
  See application file for complete search history.

(56) References Cited

U.S. PATENT DOCUMENTS

| | | | |
|---|---|---|---|
| 9,217,664 | B2 | 12/2015 | Lanham et al. |
| 2003/0191598 | A1 | 10/2003 | Normen |
| 2007/0234824 | A1 | 10/2007 | Bitto et al. |
| 2011/0000315 | A1* | 1/2011 | Tsubota ................ G01F 1/844 |
| | | | 73/861.357 |
| 2011/0197650 | A1 | 8/2011 | Young et al. |
| 2013/0086986 | A1* | 4/2013 | Lanham ............... G01F 1/8409 |
| | | | 73/649 |
| 2014/0188421 | A1* | 7/2014 | Fraser ................... G01F 1/8436 |
| | | | 702/100 |
| 2015/0300861 | A1* | 10/2015 | Regen .................... G01F 15/12 |
| | | | 73/37 |
| 2017/0059377 | A1* | 3/2017 | DeKalb ................... G01F 15/18 |
| 2017/0146380 | A1* | 5/2017 | Young ................... G01F 1/8409 |
| 2018/0179486 | A1 | 6/2018 | Fadell et al. |

FOREIGN PATENT DOCUMENTS

| | | |
|---|---|---|
| CN | 214471132 U | 10/2021 |
| WO | WO 2017190823 A1 | 11/2017 |

OTHER PUBLICATIONS

International Search Report and Written Opinion in International Appln. No. PCT/US2022/048615, mailed on Mar. 3, 2023, 8 pages.

malema.com [online], "Malema Sensors SumoFlo Single-Use Coriolis Flow Meter CPFM-8103 Series," Dec. 31, 2020, retrieved on Jan. 19, 2021, retrieved from URL<www.malema.com/content/images/uploaded/DS-2020/IM%20SUMOFLO%20S3%20024150.pdf>, 9 pages.

* cited by examiner

1500

```
┌─────────────────────────────────────────────────────────────┐
│ Place a preformed flow tube in a tube cavity of a mold, the │
│ mold formed with the tube cavity, a body cavity, and a gate │
│ hole, the body cavity connected to the gate hole            │
│                           1510                              │
└─────────────────────────────────────────────────────────────┘
                              │
                              ▼
┌─────────────────────────────────────────────────────────────┐
│  Inject a liquid resin into the body cavity through the     │
│                          gate hole                          │
│                           1520                              │
└─────────────────────────────────────────────────────────────┘
                              │
                              ▼
┌─────────────────────────────────────────────────────────────┐
│ Form a support in the body cavity by solidifying the liquid │
│ resin, the support formed around the flow tube, the flow    │
│        tube extending through the formed support            │
│                           1530                              │
└─────────────────────────────────────────────────────────────┘
```

FIG. 15

POLYMER-BASED CORIOLIS MASS FLOW SENSOR FABRICATED THROUGH CASTING

CROSS-REFERENCE TO RELATED APPLICATIONS

This application is a continuation of U.S. patent application Ser. No. 16/837,635, filed on Apr. 1, 2020, which claims the benefit of U.S. Provisional Patent Application No. 62/828,332, filed on Apr. 2, 2019, which are incorporated by reference herein in their entirety.

BACKGROUND

Field of the Disclosure

The present disclosure generally relates to Coriolis mass flow sensors, and specifically to a polymer-based Coriolis mass flow sensor including a flow tube and a support cast around the flow tube.

Description of the Related Arts

A Coriolis mass flow sensor measures a mass flow rate of a fluid flowing through a tube based on Coriolis principles. A typical Coriolis mass flow sensor includes one or two tubes through which the fluid flows and which are oscillated in a controlled manner. Coriolis induced deflections or the effects of such deflections on the tube(s) are measured to calculate the fluid mass flow rate of the fluid flowing through the Coriolis mass flow sensor. Additionally, fluid density can also be measured (independently of mass flow rate) by measuring the change in the resonant frequency.

A typical Coriolis mass flow sensor also includes a support that provides structural support to the tube(s). The support is usually made through injection molding. However, the support may crack during the cooling stage of injection molding, which reduces manufacturing yield. In addition, the injection molding approach is not suitable for manufacturing thin-walled polymeric tubes because the high pressure and high heat used may cause the tubes to deform during manufacturing.

Also, conventionally, Coriolis mass flow sensors are metal-based, e.g., they include heavy and large stainless steel enclosures for maintaining their positions. However, such enclosures have high cost and are not suitable for single use/disposable applications. Sterilization of flow sensors enclosed in stainless steel enclosures is typically done through chemicals. Such sterilization can be challenging and not effective. Also, in-situ calibration (i.e., calibration after a flow sensor is installed in its application) can contaminate the flow sensor.

SUMMARY

Embodiments relate to a polymer-based Coriolis mass flow sensor (also referred to as "flow sensor" and "flow cell") that includes at least one flow tube, a support cast around the flow tube, and a plastic enclosure that encloses the flow tube and the support. A casting mold with a tube cavity and a support cavity is used in the casting process. The flow tube is formed before the casting process by using a polymer material. The preformed flow tube is positioned in the tube cavity of the casting mold, and a liquid resin is poured or injected into the support cavity of the casting mold though a gate hole in the casting mold. The support cavity is around tubular legs of the flow tube. The liquid resin is cured and solidified in the support cavity to form the support around the tubular legs of the flow tube. The support clamps the tubular legs and the tubular legs extend through the support.

In some embodiments, the flow tube has a thin wall. For instance, the thickness of the wall is in a range from 0.05 mm to 0.60 mm. The thickness can be less than 35% of the inner diameter of the flow tube. A flow tube with such a thin wall can be deformed during an injection molding or over-molding process for forming the support around the flow tube due to high pressure exerted on the flow tube. Pressure exerted on the flow tube in the casting process is lower. Also, the temperature of the flow tube in the casting process can be below a threshold (e.g., 120° C.). Deformation of the flow tube can therefore be avoided.

The flow sensor may include at least one memory chip that stores calibration information for the flow sensor. The calibration information includes a plurality of calibration factors that can be used to adjust flow rates measured by the flow sensor. In some embodiments, a calibration factor is determined in a calibration process, i.e., a calibration process during the manufacturing/fabrication of the flow sensor. For instance, the calibration factor is a ratio of the flow rate of a fluid measured by the flow sensor to a reference flow rate of the fluid. The reference flow rate can be either measured by a reference flow meter or determined by using a gravimetric method. The flow sensor may also include one or more interface connectors to allow another device (e.g., a controller) to connect to a printed circuit board on which the memory chip is mounted and read out the calibration information from the memory chip.

In some embodiments, the flow tube is formed by using a polymer material. The flow sensor can be sterilized by using Gamma irradiation. The sterilization can be done after manufacturing, e.g., after the calibration process is finished. The flow sensor is suitable for single use/disposable applications, as it has low cost (the flow tube, support, and enclosure are all made from polymeric materials) and no calibration required after sterilization is needed.

BRIEF DESCRIPTION OF THE DRAWINGS

The teachings of the embodiments can be readily understood by considering the following detailed description in conjunction with the accompanying drawings.

FIG. 15 is a flow chart illustrating a process of fabricating a flow sensor, in accordance with an embodiment.

Figure 1:
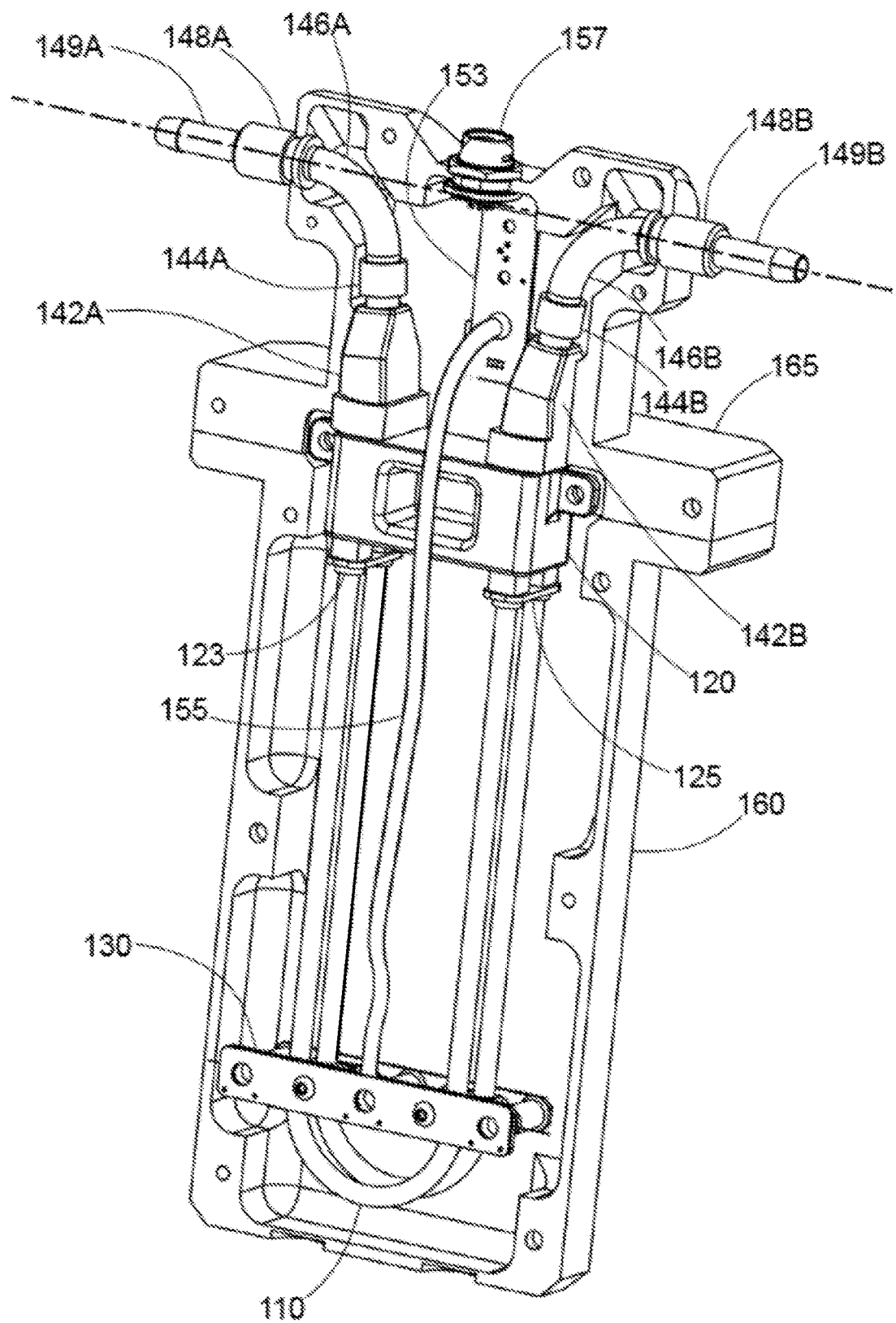
FIG. 1 is a perspective view of a flow sensor including U-shaped flow tubes, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relates to a polymer based flow sensor including a thin wall flow tube, a support, and a plastic enclosure as well as a process of fabricating such as a flow sensor. The support can be cast around the flow tube by using a casting mold that is formed with a tube cavity and a support cavity formed around portions of the tube cavity. The flow tube (e.g., U-shaped or V-shaped), which has been formed by using a polymer material, is placed in a tube cavity. A liquid resin is poured into the support cavity and solidified in the support cavity to form the support around portions of the flow tube. The flow sensor also includes a plastic enclosure that encloses the flow tube and support for maintaining their positions and reducing or eliminating impact of external vibration on them. The flow sensor can be calibrated and sterilized before it is provided to a user so that the user does not need to do any calibration or sterilization. Information generated during the calibration can be stored on a memory chip of the flow sensor and read out from the memory chip for adjusting flow rates measured by the flow sensor. The sterilization of the flow sensor can be done through Gamma irradiation (e.g., up to 50 kGy).

Such a flow sensor has advantages for single use/disposable applications, e.g., bioprocessing, biopharmaceutical applications, and pharmaceutical applications. One advantage is that it eliminates contamination caused by in-situ calibration. Single use/disposable applications often require a sterile environment and calibration after the flow sensor is installed in the sterile environment can cause contamination to the environment. Since the flow sensor has been pre-calibrated and the calibration information can be read out from the memory chip, a user can use the flow sensor without any additional or in-situ calibration. Another advantage is that the plastic enclosure has lower cost than conventionally used stainless steel enclosures, which makes the flow sensor more economical for single use applications. Also, the plastic enclosure is lighter than stainless steel enclosures so that it is easier for a user to carry and replace the flow sensor after each process. Moreover, with the plastic enclosure, the flow sensor can be sterilized by using Gamma sterilization. A flow sensor with a stainless steel enclosure cannot be sterilized with Gamma irradiation because the stainless steel enclosure can block the Gamma irradiation and create shadows on the flow tube and/or support. Flow sensors enclosed in stainless steel enclosures are typically sterilized by using chemicals, which is not as effective as Gamma radiation.

FIG. 1 is a perspective view of a flow sensor 100 including U-shaped flow tubes 110, in accordance with an embodiment. The flow sensor 100 measures flow rate and/or density of a fluid (e.g., liquid or gas) flowing through it. In addition to the flow tubes 110 (individually referred as "flow tube 110"), the flow sensor 100 also includes a support 120 for the flow tubes, an electromagnetic assembly 130, two flow path assemblies, an electronic assembly, and an enclosure assembly. The flow sensor 100 may include additional, fewer, or different components. For example, the flow sensor 100 may include a temperature assembly for measuring temperatures of the fluid or other sensor for measuring other properties of the fluid. FIG. 1 shows two flow tubes 110, but the flow sensor 100 may have one flow tube 110 or more than two flow tubes 110.

The flow tubes 110 allow the fluid to flow through them. The flow tubes 110 vibrate as driven by the electromagnetic assembly 130, and their vibration can be changed by the flow of the fluid. For instance, the flow tubes 110 can twist, which results in a phase shift. Also, the vibration resonant frequency can change. The mass flow rate of the fluid can be directly determined based on the phase shift. The density of the fluid can be directly determined based on the change in vibration resonant frequency. More details regarding the vibration of the flow tubes 110 and the determination of the flow rate and density are described below in conjunction with the electromagnetic assembly 130.

As shown in FIG. 1, each flow tube 110 is a U-shaped tube having two parallel tubular legs. The fluid flows into one of the tubular legs (referred as "inlet tubular leg") and flows out from the other tubular leg (referred as "outlet tubular leg"). The flow tube 110 can have a curvilinear shape. One advantage of such a curvilinear shape is that there are no corners so there are no abrupt changes in direction along the flow path of the fluid. Accordingly, possible accumulation of solids or any other contaminants inside the flow tubes 110 that may cause increased pressure drop or cause the flow tubes 110 to dislodge from the support 120, which can result in particle contamination, is eliminated. In some other embodiments, the flow tube 110 can be in other shapes, such as V-shape, square, rectangular, triangular, elliptic, or straight.

In some embodiments, each flow tube 110 has a thin wall that is less than 1 mm thick, e.g., 0.05 mm to 0.60 mm thick. The thickness of the wall may be 5% to 35% of the inner diameter of the flow tube 110. With such a thin wall, the flow tube 110 has good accuracy (e.g., +/−1% of measured flow rates) even at low fluid flow rates, such as 0.05-5 g/min (gram/minute) of mass flow rate or 0.05-5 ml/min of volumetric flow rate.

The inner diameter of the flow tube 110 determines the range of flow rates that the flow sensor 100 measures (also referred to as "flow rate range of the flow sensor 100"). For instance, when the inner diameter of the flow tube 110 is in the range from 0.1 mm to 0.3 mm, the flow rate range of the flow sensor 100 is 0.05 g/min to 5 g/min and the turn down ratio of the flow sensor 100 is 100. When the inner diameter of the flow tube 110 is in the range from 0.3 mm to 0.9 mm, the flow rate range of the flow sensor 100 is 0.25 g/min to 50 g/m and the turn down ratio of the flow sensor 100 is 200. When the inner diameter of the flow tube 110 is in the range from 5.5 mm to 6.5 mm, the flow rate range of the flow sensor 100 is 15 g/min to 3 kg/m and the turn down ratio of the flow sensor 100 is 200. When the inner diameter of the flow tube 110 is in the range from 7.8 mm to 12.5 mm, the flow rate range of the flow sensor 100 is 90 g/min to 20 kg/m and the turn down ratio of the flow sensor 100 is about 222. When the inner diameter of the flow tube 110 is in the range from 50 mm to 60 mm, the flow rate range of the flow sensor 100 is 1 kg/min to 250 kg/m and the turn down ratio of the flow sensor 100 is 250. The outer diameter of the flow tube 110 can be in a range from 0.2 mm to 60 mm.

In the embodiment of FIG. 1, the two flow tubes 110 are identical, i.e., they have identical shape and dimensions. In some other embodiments, the two flow tubes 110 can be different. The flow tubes 110 can be made of a polymer material, such as Polyetheretherketone (PEEK), Perfluoroalkoxy polymers (PFAs), polyvinylidene difluoride (PVDF), Polytetrafluoroethylene (PTFE), and Fluorinated ethylene propylene (FEP).

The support 120 provides structural support for the flow tubes 110. The support 120 may be fabricated by casting around the tubular legs of the flow tubes 110, for instance, in embodiments where the wall thickness of the flow tubes 110 is no more than 0.6 mm. The support 120 includes tubular channels through which the flow tubes 110 extend. The support 120 clamps the outer surface of the two tubular legs of each of the flow tubes 110 to hold the flow tubes 110. Compared with other fabrication methods (e.g., injection molding or over-molding), pressure exerted on the flow tubes 110 and temperature of the flow tubes 110 during the casting process is low so that deformation of the flow tubes 110 can be avoided. More details regarding the casting are described below in conjunction with FIGS. 2-5. In some embodiments, the support can be injection molded (or over-molded) over the tubular legs of the flow tubes 110, for instance, in embodiments where the wall thickness of the flow tubes 110 is larger than 0.6 mm.

The support 120 is a single integral piece. It may include integrated features such as one or more port extensions 123 (individually referred as "port extension 123") and isolation plates 125 (individually referred as "isolation plate 125") to secure stability of the flow tubes 110. The port extensions 123 clamp the tubular legs of the flow tubes 110. An inner surface of each port extension 123 contacts the outer surface of the corresponding tubular leg. The isolation plates 125 connect adjacent port extensions 123. The isolation plates 125 can establish the boundary conditions of vibration of the flow tubes 110 and maintain stability of the flow tubes 110. The flow tubes 110 can vibrate in opposite phases (referred as "anti-phase vibration") similar to a tuning fork and vibrate together in unison (referred as "in-phase vibration"). The natural frequencies of the anti-phase vibration and in-phase vibration can be close or even identical, resulting in vibrational excitation energy shared uncontrollably between the two vibrational modes, which causes instability of the flow tubes 110. The vibrational boundary conditions created by the isolation plates 125 can separate the natural frequencies of the anti-phase vibration and in-phase vibration to prevent instability of the flow sensor 100. The dimensions and thickness of the isolation plates 125 can be determined based on the frequency response characteristics of the flow tubes 110. In some embodiments, the isolation plates 125 are integrated with the port extensions 123, both of which are integrated with the support 120.

The electromagnetic assembly 130 drives vibration of the flow tubes 110. The electromagnetic assembly 130 includes three magnets, three coils, and two racks. The magnets are mounted on one of the two racks, which is attached on one of the flow tubes 110. The coils are mounted to the other rack, which is attached on the other flow tube 110. One of the three coils, e.g., the coil in the middle, can receive an alternating current, e.g., from a controller (e.g., a flow transmitter) connected to the flow sensor 100. The alternating current causes the magnet corresponding to the coil to be attracted and repelled, thereby driving the flow tubes 110 to move towards and away from each another.

The electromagnetic assembly 130 also detects changes in the vibration of the flow tubes 110 due to the flow of the fluid and outputs electrical signals that can be used to measure flow rate and density of the fluid. When the fluid flows through the flow tubes 110, Coriolis forces produce a twisting vibration of the flow tubes 110, which results in a phase shift. As the magnets and coils are mounted on the flow tubes, the phase shift can be captured by the magnets and coils, e.g., represented by electrical signals of the coils and be used to determine a mass flow rate of the fluid.

The density of the fluid relates to the resonant frequency of the flow tubes 110. The density of the fluids can thereby be determined by monitoring the change in the resonant frequency of the flow tubes 110. The resonant frequency of the flow tubes 110 depends at least on the density of the fluid present in the flow tubes 110 and the density of a material of the flow tubes 110.

The inlet flow path assembly provides a flow path for the fluid to flow into the flow tubes 110 (referred to as "inlet flow path"). The inlet flow path assembly includes a Y block 142A, a Y block adapter 144A, a tubing elbow 146A, a barb adapter 148A, and a hose barb 149A. The Y block 142A includes a top/inlet port on one side and two bottom/outlet ports on the other side. It is formed with an internal channel that connects the top port to the two bottom ports. The outlet ports of the Y block 142A are assembled and bonded onto the inlet tubular legs of the flow tubes 110. The inlet port the Y block 142A is bonded to the Y block adapter 144A, which is bonded to one end of the tubing elbow 146A. The tubing elbow 146A forms an angle that is greater than 90° and provides a sweep turn to the fluid. Compared with a 90° turn, the fluid encounters a lower shear force when it flows through the tubing elbow 146A, which protects matters in the fluid from being damaged or destructively impacted. The matters in the fluid can be organic matters, such as live cells, protein, virus, bacteria, etc. The other end of the tubing elbow 146A is connected to the barb adapter 148A, which is also connected to the hose barb 149A. The hose barb 149A can be connect to a hose as required by the user when the user installs the flow sensor 100. More details about Y block and hose barb are described below in conjunction with FIGS. 8-10.

The outlet flow path assembly provides a flow path for the fluid to flow out from the flow tubes 110 (referred to as "outlet flow path"). Similar to the inlet flow path assembly, the outlet flow path assembly includes a Y block 142B, a Y block adapter 144B, a tubing elbow 146B, a barb adapter 148B, and a hose barb 149B, which are connected similarly as the components of the inlet flow path assembly described above. The hose barb 149B can be connect to another hose as required by the user when the user installs the flow sensor 100.

The hose barbs 149A and 149B are aligned in a straight line, as illustrate by the dashed line in FIG. 1, so that the outlet flow path is colinear to the inlet flow path. Such an alignment is desirable for installing the flow sensor 100 into a system (e.g., a process skid) having a flow path arranged in a straight line. It is easier to install and plumb the flow sensor 100 in such a flow path. In other embodiments, the inlet and outlet flow path assemblies can have different components and different alignments for fitting in different flow paths.

The components of the inlet and outlet flow path assemblies can be made from a polymer (such as PEEK) by various processes, such as machining, extruding, injection molding, bending, etc. The components can be bonded together by using a glue, such as epoxy resin. These components and the glue can be sterilized by using Gamma irradiation, e.g., they are compliant for Class VI Gamma sterilization up to 50 kGy.

The electronic assembly facilitates storage and transmission of data associated with the flow sensor 100. The electronic assembly includes a printed circuit board (PCB) 153, at least one memory chip (not shown in FIG. 1) mounted on the PCB 153, an interface cable 155 connected to the PCB 153, and an interface connector 157 connected to or assembled on the PCB 153.

The PCB 153 provides structural support for components mounted on it, such as the memory chip. The memory chip stores calibration information of the flow sensor 100. The calibration information can be used to adjust a flow rate or density measured by the flow sensor 100. In some embodiments, the calibration information includes a plurality of calibration factors. Each calibration factor is for adjusting flow rates in a segment of the flow rate range of the flow sensor 100. For example, in an embodiment where the flow rate range of the flow sensor 100 is 0.25-50 g/min, the calibration information includes a first calibration factor for adjusting flow rates in the range from 0.25 g/min to 3 g/min, a second calibration factor for 3-10 g/min, and a third calibration factor for 10-50 g/min. The calibration information may include fewer or more than three calibration factors. The number of calibration factors in the calibration information may be determined based on a desired accuracy of the flow sensor 100, the flow rate range of the flow sensor, the size of the memory chip, other factors, or some combinations thereof. In some embodiments, the number of calibration factors increases with the desired accuracy of the flow sensor 100 and decrease as the flow rate range of the flow sensor 100 goes up. The calibration information can be read out from the memory chip, e.g., by a flow transmitter, through the interface connector 157.

The interface cable 155 connects the coils to the PCB 153. In FIG. 1, the interface cable 155 is also assembled onto the PCB 153 that provides structural support to the interface cable 155. More details about the electronic assembly are described below in conjunction with FIG. 7.

The enclosure assembly encloses the flow tube 110, the support 120, the electromagnetic assembly 130, and the electronic assembly and provides structural support to them. The enclosure assembly, shown in cut away in FIG. 1, includes an enclosure cup 160 and an enclosure lid 165. The enclosure lid 165 can be mounted on the enclosure cup 160, e.g., through bolts. In some embodiments, the enclosure assembly is made of a polymer material, e.g., glass filled polycarbonate or PEEK.

The flow tubes 110 and the support 120 can be integrated and disposed as one piece. For instance, the flow tubes 110 are removable mounted on the electromagnetic assembly 130 and the support 120 are removably mounted on the enclosure lid 165, e.g., through mounting tabs and bolts. This way, the flow tubes 110 and the support 120 can be removed from the electromagnetic assembly 130 and enclosure assembly, and new/other flow tubes and support can be mounted on the electromagnetic assembly 130 and enclosure assembly. In some embodiments, the flow tubes 110, the support 120, and the electromagnetic assembly 130 are integrated to be one piece and they can be disposed as one piece when needed. This design is suitable for disposable applications, such as applications where flow sensors need to be disposed to avoid contamination from fluids used in previous process. With such a design, the flow tubes 110 and the support 120 can be disposed as one piece, e.g., after single use, and the other components of the flow sensor 100 can be reused. Compared with disposing the whole flow sensor 100, this is more environmentally friendly and cost efficient.

Figure 2:
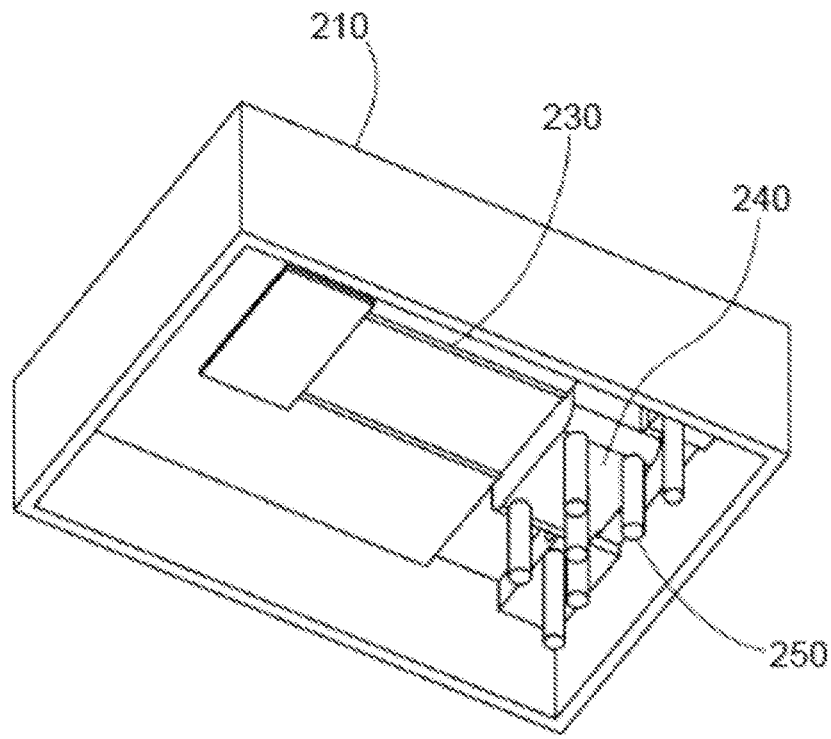
FIG. 2 illustrates a positive casting mold used for casting negative silicone molds, in accordance with an embodiment.
Figure 2:
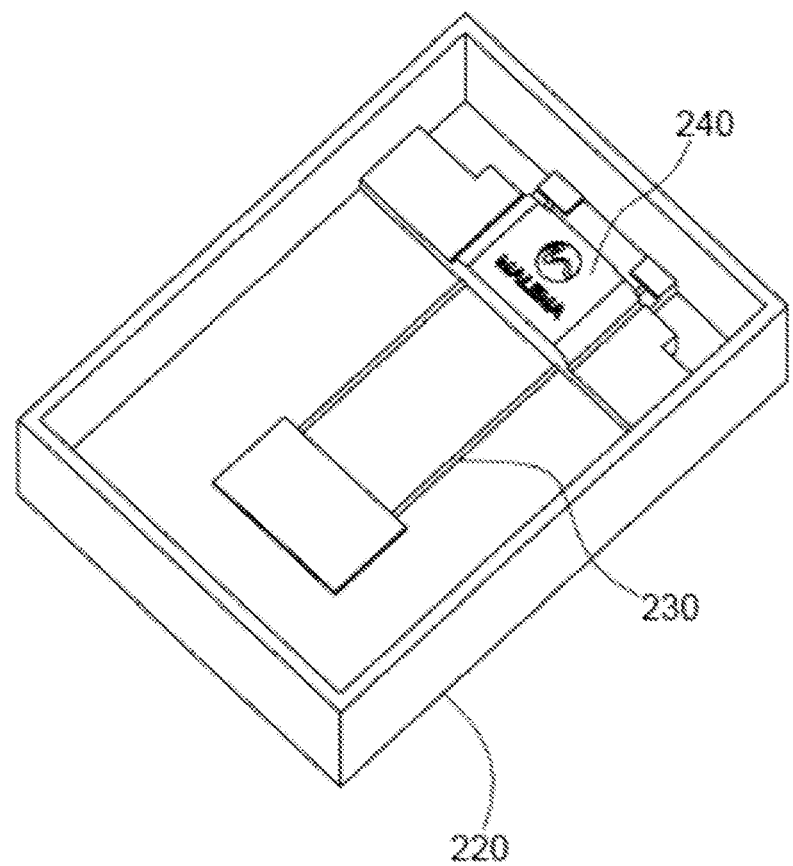

FIG. 2 illustrates a positive casting mold 200 used for casting negative silicone molds, in accordance with an embodiment. The positive casting mold 200 includes two halves 210 and 220. The two halves 210 and 220 can be formed by 3D printing, such as a stereolithography process, by using a typical hard 3D printing plastic, such as PLA (polylactic acid), ABS (acrylonitrile butadiene styrene), PETG (polyethylene terephthalate), etc.

Each of the two halves 210 and 220 include a tube profile 230 and a body profile 240. The tube profile is used to create a tube cavity in a negative casting mold made from the positive casting mold 200. The body profile 240 is used to create a support cavity in the negative casting mold. The half 210 includes a plurality of cylindrical profiles 250, which are used to create holes (e.g., gate holes and vent holes) in the negative casting mold.

In some embodiments, a negative casting mold is made by casting a silicone rubber in the positive casting mold 200. For example, the silicone rubber is cast in the half 210 to make a half of the negative casting mold and cast in the half 220 to make the other half of the negative casting mold. The silicone rubber can be a two-part (part A and part B) silicone rubber, such as platinum silicone rubber (e.g., Smooth-Sil™ 945). In one embodiment, part A is a silicone elastomer and part B is a silicone elastomer crosslinker (Urethane) or catalyst. Two equal amounts (either weight or volume) of parts A and B are dispensed into a mixing container to be mixed. After mixing Parts A and B, vacuum degassing may be used to eliminate any entrapped air. The remaining air pressure in the mixing container is around or less than 29 inches of mercury. It typically takes two to three minutes to vacuum the mixing container. In some instances, the mixture is poured into a single spot at the lowest point of the positive casting mold 200. The mixture expands in the cavities of the positive casting mold 300. Entrapped air can be minimized by a uniform flow of the mixture. The mixture is then cured at room temperature, e.g., for about 24 hours. After curing, the mixture is exposed to a higher temperature (e.g., 176° F./80° C.) for two hours and another higher temperature (e.g., 212° F./100° C.) for one hour. The negative casting mold is formed and then cooled down to room temperature. The negative casting mold is then used to fabricate flow sensors.

Figure 3:
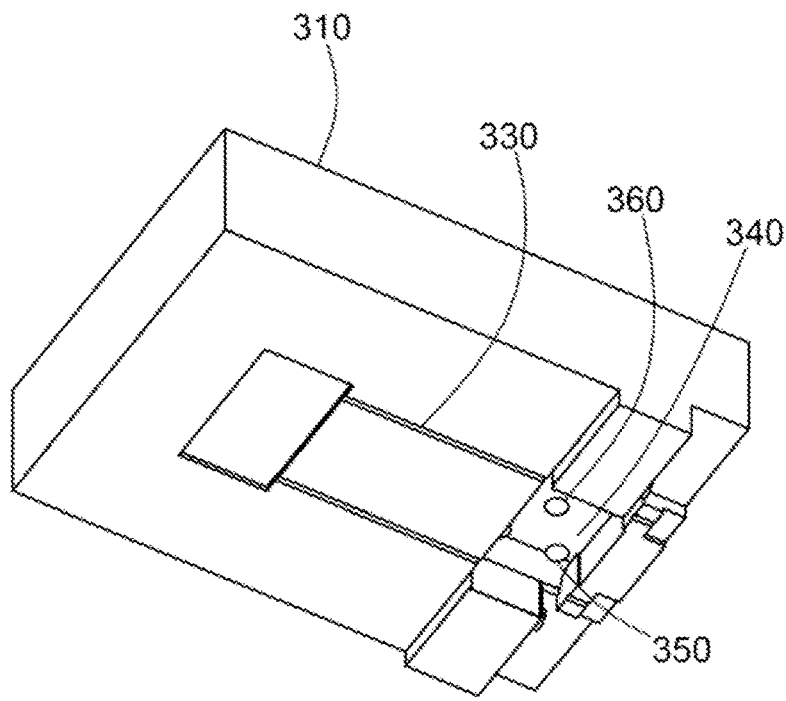
FIG. 3 illustrates a negative casting mold used for casting a support over a U-shaped flow tube, in accordance with an embodiment.
Figure 3:
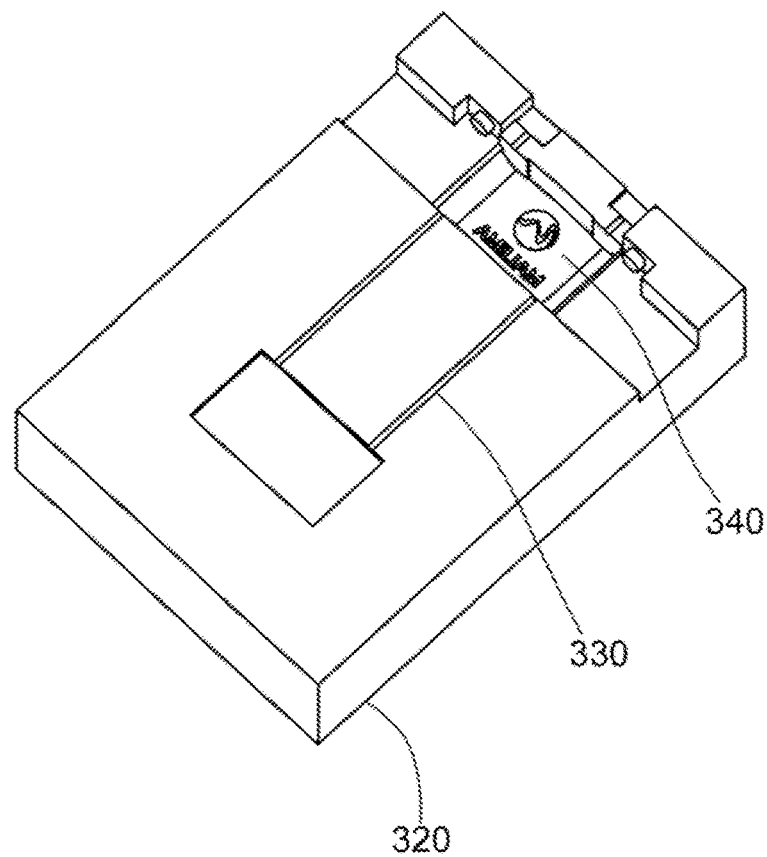

FIG. 3 illustrates a negative casting mold 300 used for casting a support over a U-shaped flow tube, in accordance with an embodiment. The negative casting mold 300 is made by using the positive casting mold 200 in FIG. 2. The negative casting mold 300 includes two halves 310 and 320. Each half includes a tube cavity 330 and a support cavity 340. When the two halves 310 and 320 are placed and aligned together, they form a tube cavity where a flow tube, e.g., the flow tube 110, can be placed and a support cavity where a support, e.g., the support 120, can be formed around the flow tube. The half 310 is also formed with a gate hole 350 and a vent hole 360. In some embodiments, the half 310 can be formed with multiple gate holes and/or multiple vent holes. The gate hole 350 is connected to the support cavity 340 so that a liquid resin can be poured or injected into the support cavity 340 through the gate hole 350, e.g., by using a syringe. The vent hole 360 allows air to escape from the negative casting mold 300 and can facilitate free flow of the liquified resin throughout the support cavity 340 to form the support.

Figure 4:
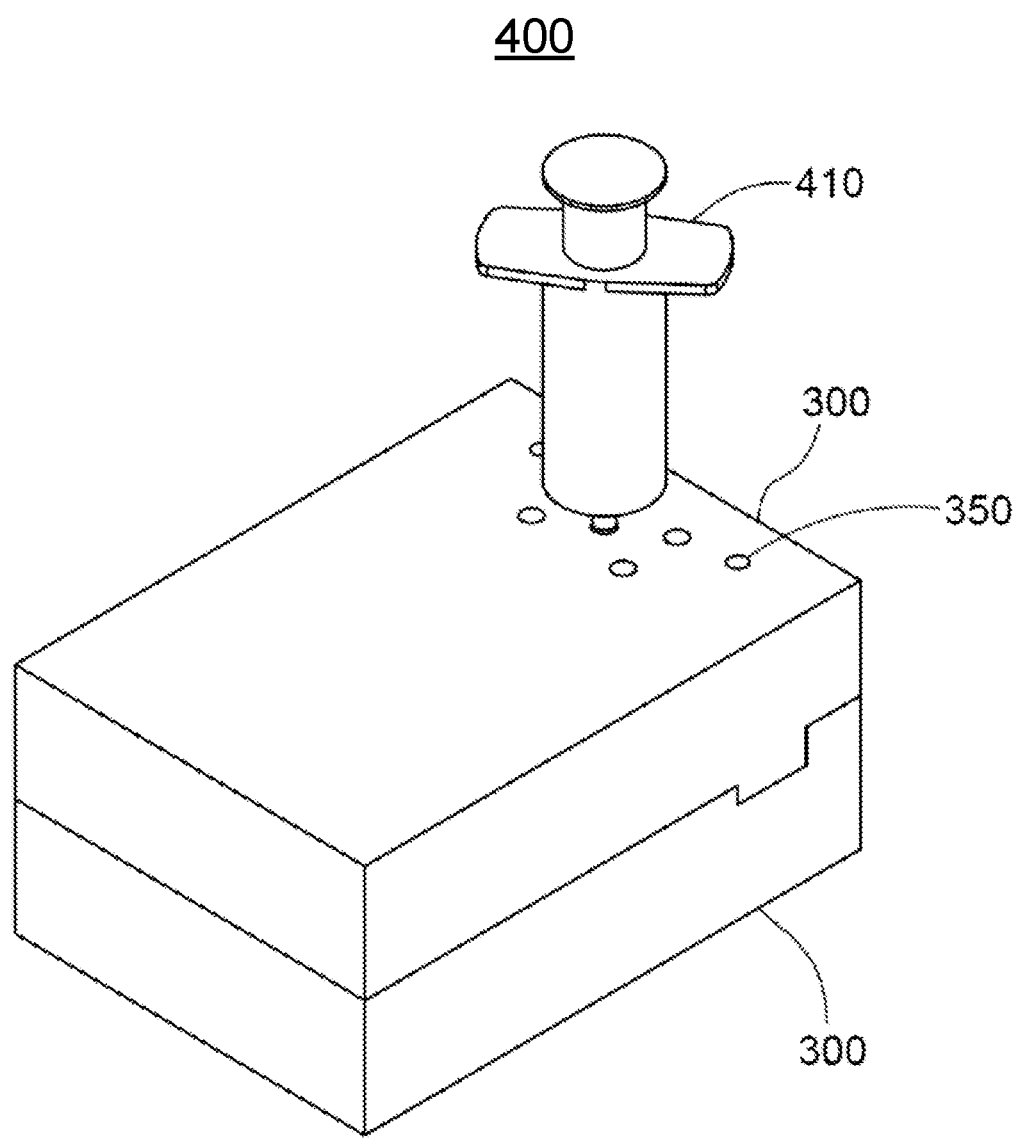
FIG. 4 illustrates a casting system including the negative casting mold, in accordance with an embodiment.

FIG. 4 illustrates a casting system 400 including the negative casting mold 300, in accordance with an embodiment. The casting system 400 also includes an injector 410. In FIG. 4, the halves of the negative casting mold 300 are placed together with a flow tube sitting in the tube cavity. An outlet of the injector 410 is inserted into a gate hole 350 of the negative casting mold 300. The injector 410 is at least partially filled with a liquid resin, e.g., polyurethane setting resin. In some embodiments, the liquid resin is formed from two materials. The first material can be methylenediphenyl diisocyanate. The second material can be 4,4' Methylene bis(phenylisocyanate) or Benzene, 1,1'-methylenebis[4-isocyanato-], homopolymer. The two materials are dispensed into a mixing container to be mixed. A same amount (e.g., weight or volume) of the two materials can be dispensed into the mixing container to be mixed and form the resin.

The liquid resin can be injected into the support cavity of the negative casting mold 300 through the injector 410 and the gate hole 350. In FIG. 4, the injector 410 is in a form of a syringe. In other embodiments, the injector 410 can be in other forms. For instance, the injector 410 may include a cup, and the liquid resin can be poured into the negative casting mold 300 through the cup. It may take less than 2.5 minutes to inject sufficient amount of the liquid resin into the negative casting mold 300. After the injection is done, the liquid resin is cured in the negative casting mold 300. The liquid resin is cured and solidified, e.g., through a chemical reaction, and forms a support around the flow tube. It may take about one hour for the liquid resin to cure and solidify.

This casting process is advantageous compared with other fabrication methods, such as injection molding or overmolding. For example, the highest temperature inside the negative casting mold 300 during the casting process is below a threshold temperature (e.g., 100-120° C.), thus avoiding deformation of the flow tube. Also, the pressure exerted on the flow tube during the casting process is low so that deformation of the flow tube, which has thin wall and small diameter, can be avoided. Thus, the casting process can be used to fabricate flow sensors that has flow tubes with thin walls and small diameters.

Figure 5:
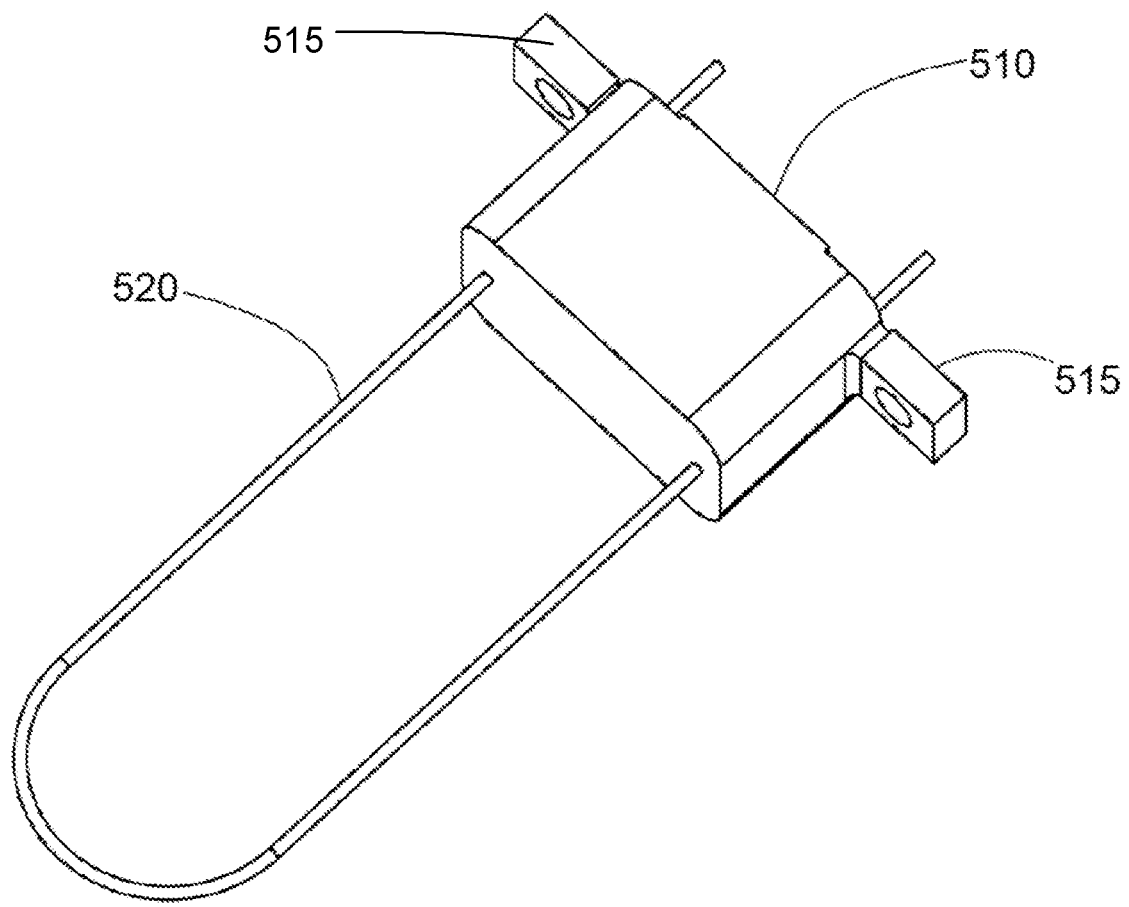
FIG. 5 illustrates a support cast around a U-shaped flow tube by using the casting system, in accordance with an embodiment.

FIG. 5 illustrates a support 510 cast around a U-shaped flow tube 520 by using the casting system 400, in accordance with an embodiment. The support 510 clamps the tubular legs of the flow tube 520. The tubular legs extend through the support 510.

As the support 510 is cast around the flow tube 520, the support 510 is integrated with the flow tubes 510 without any use of welding joint, adhesive joint, or other types of joint. Integrity and reliability of the flow tubes 520 and the support 510 can depend on properties of the materials that they are made of. In some embodiments, the material of the support 510 (e.g., polyurethane setting resin) has a similar coefficient of thermal expansion as the material of the flow tube 520 (e.g., PEEK) so that the support 510 can remain clamping the flow tubes 520 despite temperature change. In some embodiments, the material of the support 510 has a higher stiffness (i.e., rigidity or elastic modulus) and/or a lower dampening coefficient than the material of the flow tubes 520 to ensure that the support 510 provides a more unyielding and constant boundary condition for terminating the vibration of the flow tubes 520.

The support 510 includes a pair of mounting tabs 515 (individually referred to as "mounting tab 515") on opposite sides of the support 510. The mounting tabs 515 can be used for attaching the support 510 onto an enclosure lid, e.g., the enclosure lid 165. In some embodiments, the support 510 can have fewer or more mounting tabs 515. Also, the orientation and position of a mounting tab 515 can be different from FIG. 5. For instance, one or both of the mounting tabs 515 can be oriented vertically or horizontally to suit the enclosure onto which they are mounted.

FIGS. 2-5 shows casting a support around one flow tube. In other embodiments, a support can be cast around two or more flow tubes.

Figure 6:
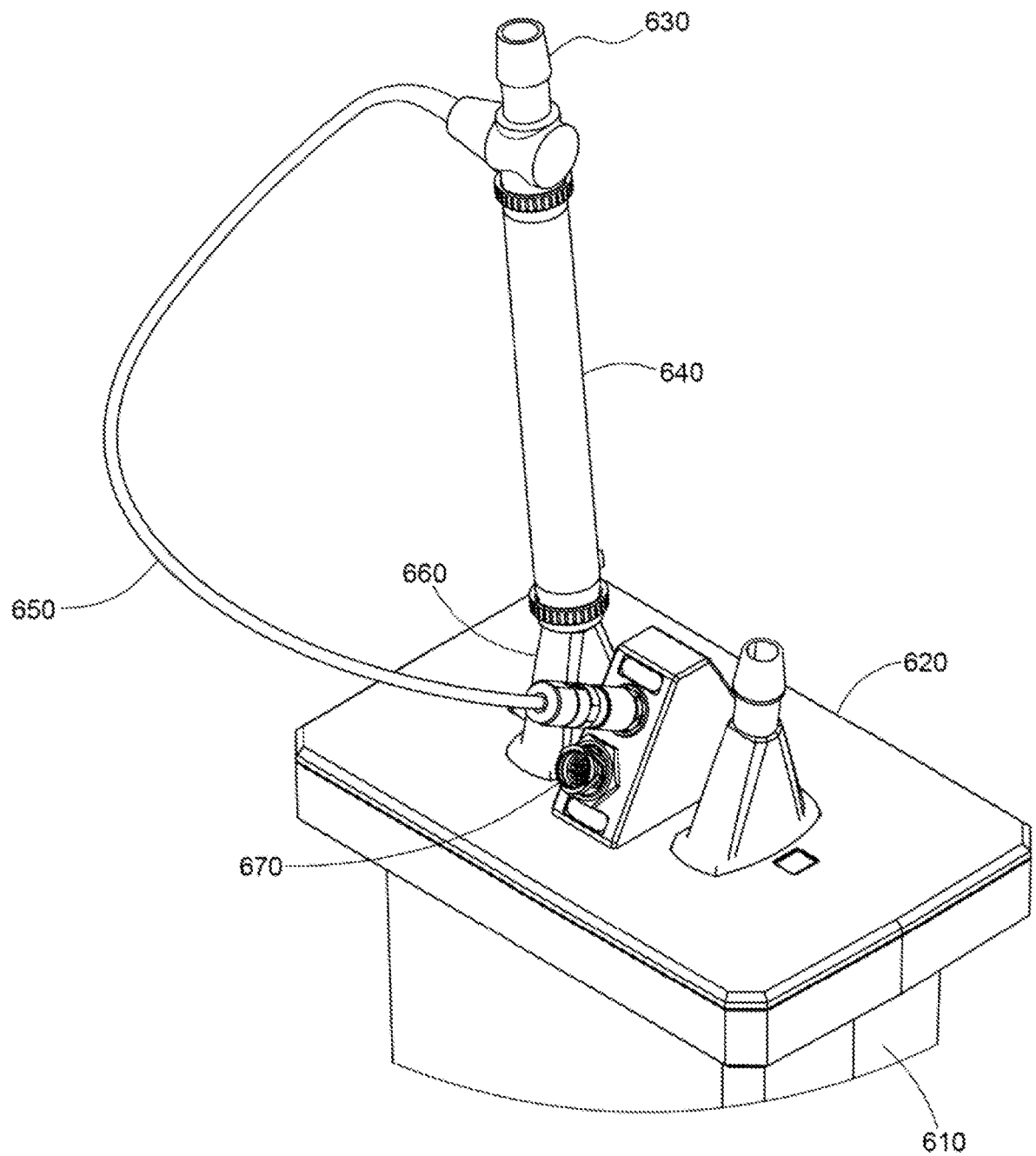
FIG. 6 illustrates a temperature measurement assembly mounted on an enclosure lid of a flow sensor, in accordance with an embodiment.

FIG. 6 illustrates a temperature measurement assembly 600 mounted on an enclosure lid 620 of a flow sensor 610, in accordance with an embodiment. The temperature measurement assembly 600 is external of the flow sensor 610. The temperature measurement assembly 600 measures temperatures of a fluid flowing through the flow sensor 610. The temperature measurement assembly 600 includes a temperature probe 630, a tubing 640, and an interface cable 650.

The tubing 640 encloses at least a portion of the temperature probe 630. The tubing 640 is mounted on a Y block 660 of the flow sensor 610. The Y block 660 can be the inlet Y block or outlet Y block of the flow sensor 610. The fluid flows through the tubing 640 to get into the flow sensor 610. The temperature probe 630 detects a temperature of the fluid and generates a signal representing the temperature. The signal can be sent to a controller, e.g., a flow transmitter, to determine the temperature of the fluid. In some embodiments, the interface cable 650 connects the temperature probe 630 to a PCB (not shown in FIG. 6) of the flow sensor 610. The signal can be transmitted from the temperature probe 630 to the PCB through the interface cable. An interface connector 670 is mounted on the PCB to facilitate connection between the PCB and another device, e.g., a flow transmitter, so that the flow transmitter can receive the signal generated by the temperature probe 630 to determine the temperature of the fluid.

The flow transmitter can use the temperature to dynamically adjust flow rate and/or density of the fluid and achieve high accuracy in flow rate measurement or density measurement. In some embodiments, the temperature measured by the temperature measurement assembly 600 is input into a model (e.g., an algorithm) for adjusting a flow rate or density measured by the flow sensor 610. The model can be developed based on a plurality of fluid temperatures (e.g., temperatures in a range from 2° C. to 40° C.) and a plurality of corresponding flow rates/densities. In some embodiments, the model is developed based on dimensional information of the flow sensor 610, such as dimensions (e.g., diameter, length, etc.) of a flow tube in the flow sensor 610. The model and/or parameters of the model can be stored in the memory chips. The flow transmitter reads out the model and/or parameters of the model and inputs the temperature of the fluid into the model to adjust the flow rate or density measured by the flow sensor 610.

Figure 7:
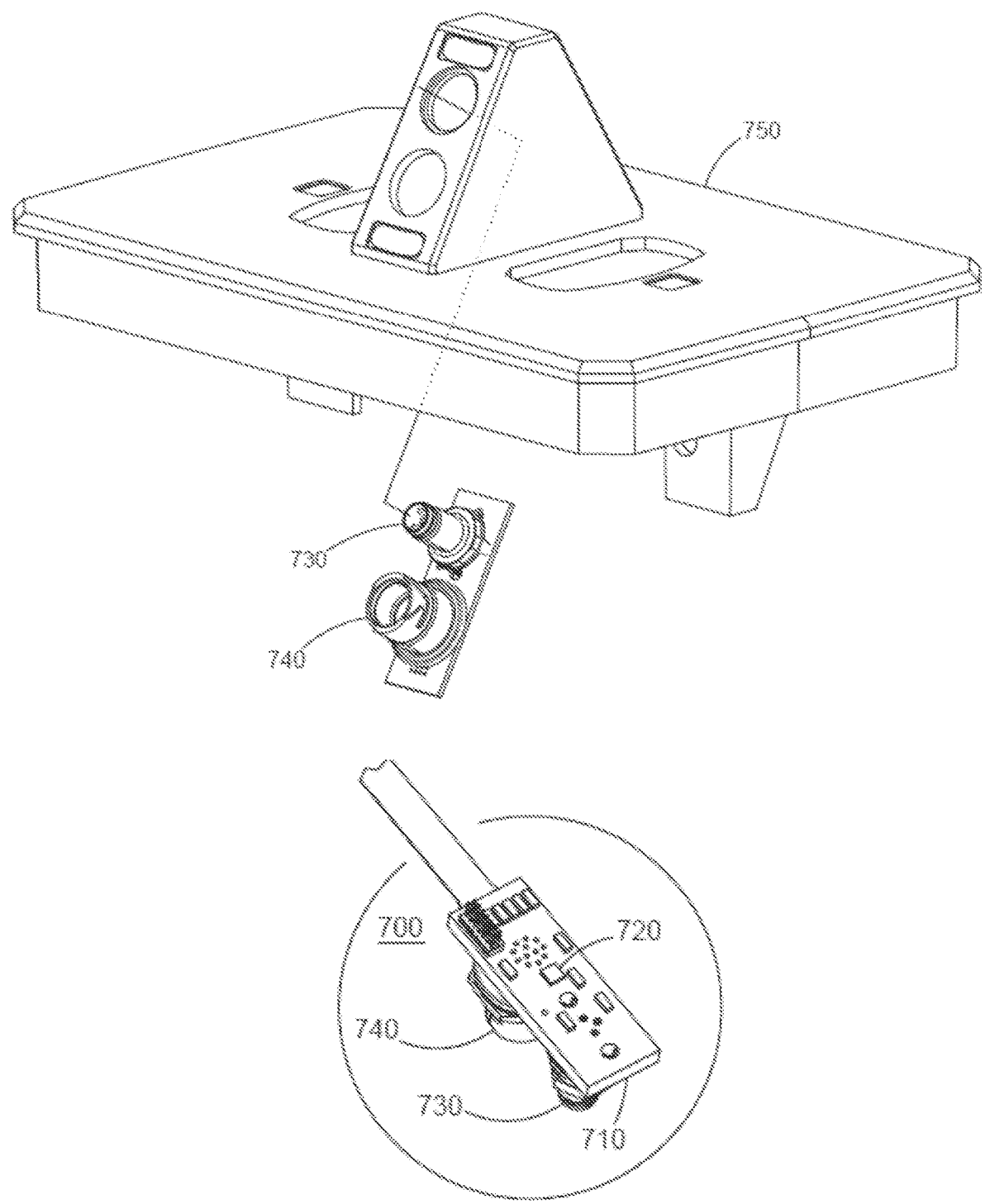
FIG. 7 illustrates an electronic assembly, in accordance with an embodiment.

FIG. 7 illustrates an electronic assembly 700, in accordance with an embodiment. The electronic assembly 700 facilitates storage and transmission of data associated with a flow sensor. It is mounted on the enclosure lid 750 of the flow sensor. The electronic assembly 700 includes a PCB 710, a memory chip 720, and interface connectors 730 and 740. The memory chip 720 and interface connectors 730 and 740 are mounted on the PCB 710. In some embodiments, the electronic assembly 700 can include fewer, more, or different components. For example, the electronic assembly 700 can include more than one memory chip.

The memory chip 720 stores data associated with the flow sensor. The data includes, e.g., calibration information of the flow sensor that is determined in a pre-calibration process, manufacturing information of the flow sensor, identification information (e.g., serial number) of the flow sensor, temperature information of a fluid flowing through the flow meter, etc. The memory chip 720 is Gamma compliant, meaning it can be sterilized by using Gamma radiation without malfunction or losing any data stored on it.

The calibration information can be used to adjust a flow rate measured by the flow sensor for better accuracy. For instance, the calibration information is used to offset an error in a flow rate measured by the flow sensor. In some embodiments, the accuracy of the adjusted flow rate can be within +/−1%. In some embodiments, the calibration information includes a plurality of calibration factors. Each calibration factor indicates a difference from a reference flow rate and a flow rate measured by the flow sensor (referred to as "measured flow rate"). In some embodiments, the reference flow rate can either be a flow rate measured by a reference flow meter of the same fluid flowing through the flow sensor. The reference flow meter can be a flow meter that has already been calibrated. In some other embodiments, the reference flow rate is determined by using a gravimetric method. For instance, a calibrated scale is used to measure a weight of a portion of fluid that flow for a predetermined amount of time. The reference flow rate can be the weight divided by the predetermined amount of time. For instance, the calibration factor can be a ratio of the measured flow rate to the reference flow rate.

With the calibration information stored in the memory chip 720, in-situ calibration can be avoided, which promotes interchangeability of the flow sensor in single use applications. In-situ calibration can still be performed if desired. For instance, the calibration factors in the memory chip can be updated based on the result of an in-situ calibration to further improve the accuracy, e.g., to +/−0.5% or even +/−0.25%. Such an improved accuracy can be beneficial in chromatograph, cell culture, continuous processing, and tangential flow filtration applications.

The interface connectors 730 and 740 provide input and output interface of the PCB 710. For instances, the interface connector 730 can be connected to a cable of a temperature measurement assembly, such as the temperature measurement assembly 600, and allow temperature data generated by the temperature measurement assembly to be transmitted to the PCB 710. The interface connector 740 can be connected to a cable of a controller (e.g., a flow transmitter) and allow the controller to read data from the memory chip 720 or receive data from the temperature measurement assembly.

As shown in FIG. 7, the memory chip 720 is mounted on one side of the PCB 710 and the interface connectors 730 and 740 are mounted on the other side of the PCB 710. In some other embodiments, the interface connectors 730 and 740 can be mounted on different sides of the PCB 710. Also, the memory chip 720 and the interface connectors 730 and 740 can be mounted on the same side of the PCB 710.

Figure 8B:
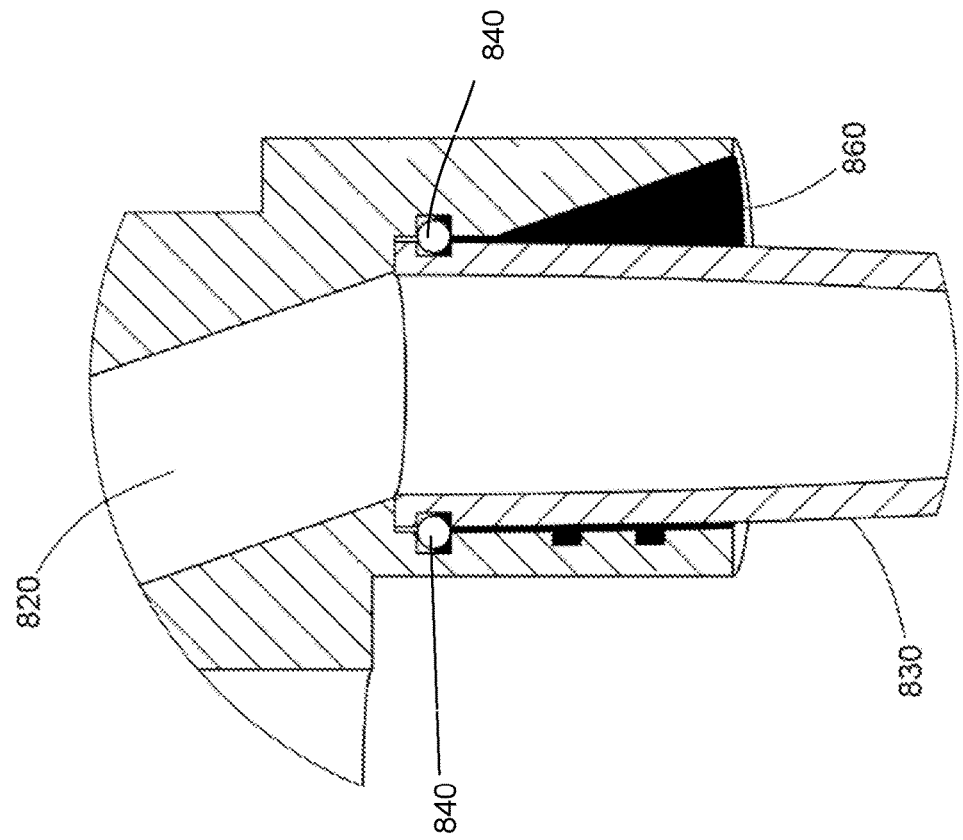
FIG. 8B is a cross-sectional view of the Y block, in accordance with an embodiment.
Figure 8A:
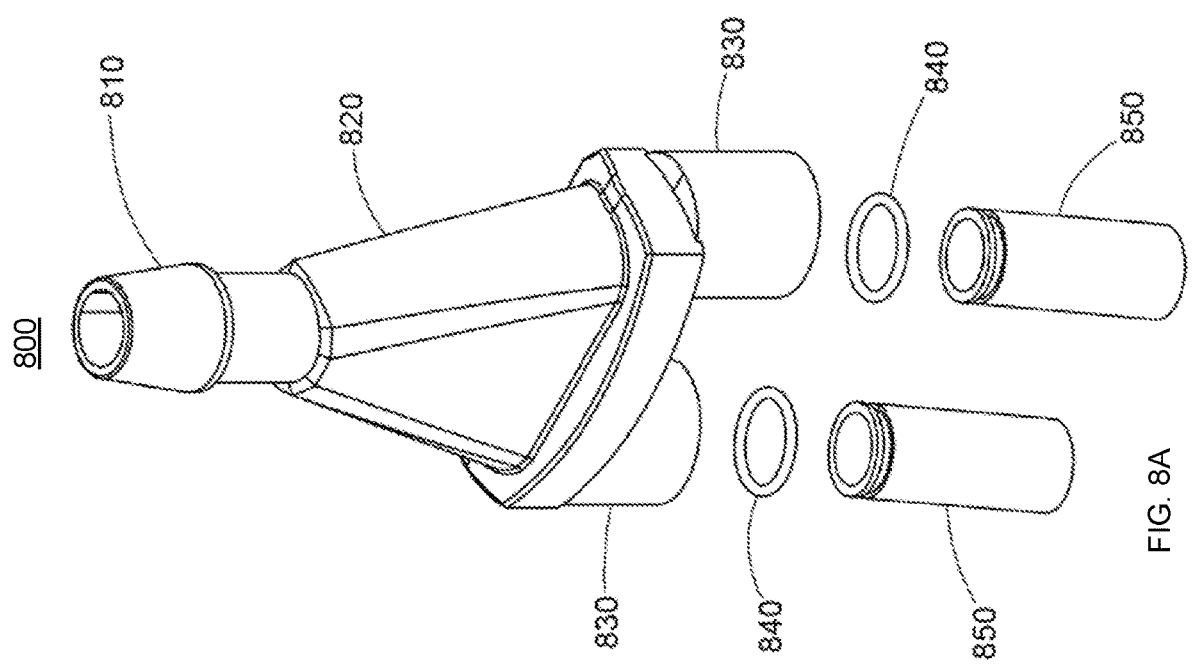
FIG. 8A illustrates a Y block for a U-shaped flow tube, in accordance with an embodiment.

FIG. 8A illustrates a Y block 800 for a U-shaped flow tube, in accordance with an embodiment. FIG. 8B is a cross-sectional view of the Y block 800, in accordance with an embodiment. The Y block 800 includes a top port 810, a triangular body 820, and two bottom ports 830. The top port 810 and bottom ports 830 are built on the triangular body 820. A fluid can either enter the Y block 800 from the top port 810 and exit the Y block 800 from the bottom ports 830 (individually referred as "bottom port 830"), e.g., when the Y block 800 functions as an inlet Y block, or enter from the bottom ports 830 and exit from the top port 810, e.g., when the Y block 800 functions as an outlet Y block.

Each bottom port 830 is bonded to a tubular leg 850 of the flow tube. In some embodiments, a bottom port 830 can be adhered to the corresponding tubular leg 850 by using a glue. The glue is represented by the black shaded area in FIG. 8B. The glue can be epoxy resin, such as Loctite M-31CL. The bottom port 830 can be formed, e.g., through injection molding, with a glue cavity 860, e.g., in a shape of a triangle. The glue can be poured into the glue cavity 860 with the Y block 800 placed upside down until the glue cavity 860 is filled and the glue is solidified. The glue is shown as the dark black shaded area in FIG. 8B.

Each bottom port 830 is formed with a groove, where an O-ring 840 can be placed. The O-ring 840 prevents the glue from entering into the flow tube. The O-ring 840 can be sterilized with Gamma radiation, e.g., it is compliant for class VI Gamma sterilization.

Figure 9A:
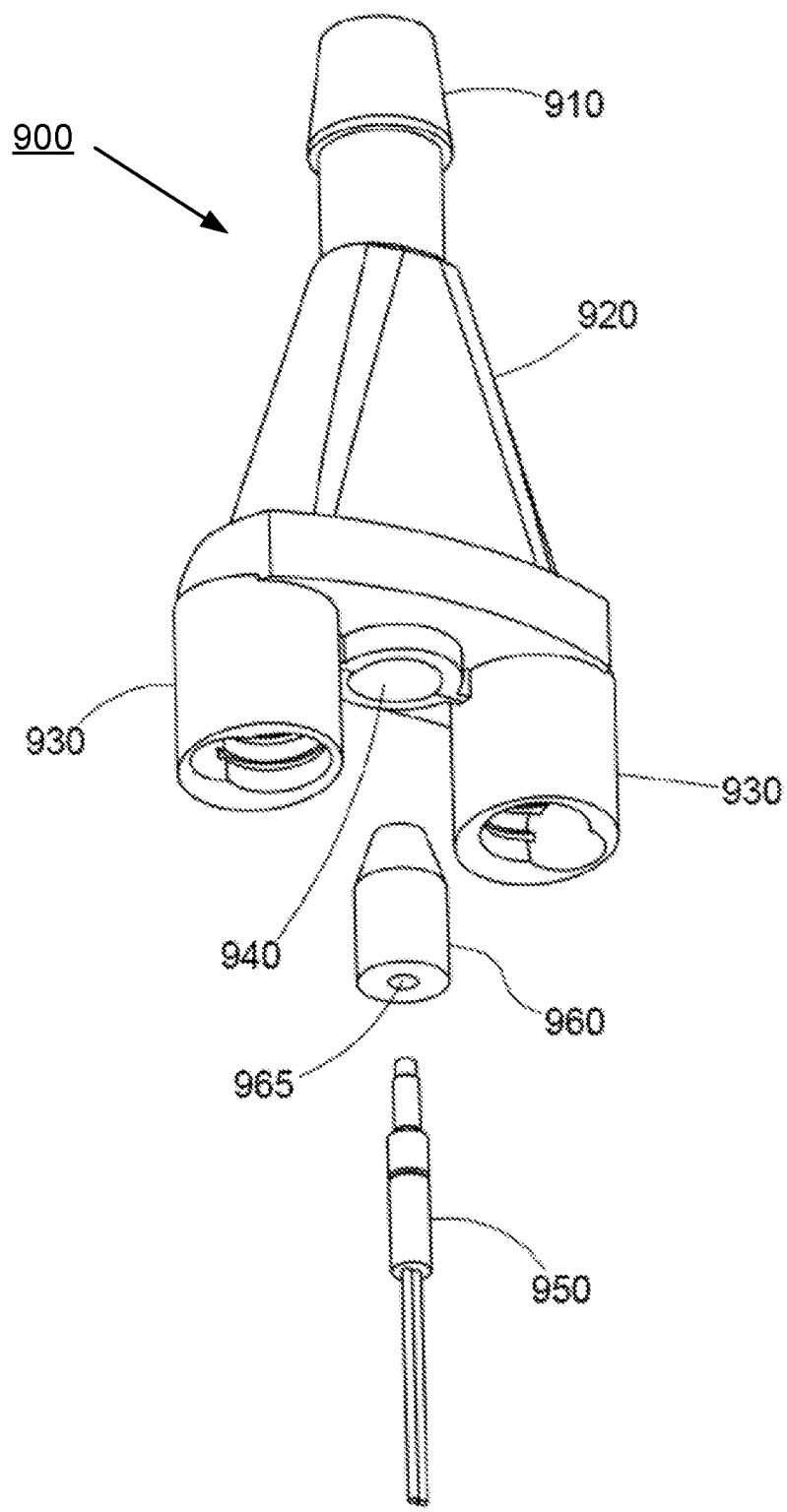
FIG. 9A illustrates a temperature probe sleeve that facilitates mounting a temperature probe onto a Y block, in accordance with an embodiment.

FIG. 9A illustrates a temperature probe sleeve 960 that facilitates mounting a temperature probe 950 onto a Y block 900, in accordance with an embodiment. Similar to the Y block 800, the Y block 900 includes a top port 910, a triangular body 920, and two bottom ports 930 (individually referred as "bottom port 930"). Additionally, the Y block 900 includes a temperature port 940 between the two bottom ports 930 for installing the temperature probe 950 in the flow path of a liquid flowing through the flow tube.

The temperature probe sleeve 960 is used to install the temperature probe 950. A top portion of the temperature probe sleeve 960 has a cone shape and can be inserted into the temperature port 940. The temperature probe sleeve 960 is formed (injection molded or machined) with a hole 965, and at least a portion of the temperature probe 950 (e.g., about 3 mm) can be inserted into the triangular body 920 of the Y block through the hole 965. The portion of the temperature probe 950 is thereby in contact with the fluid and can measure temperatures of the fluid.

In some embodiments, the temperature probe 950 is attached to the internal surface of the temperature probe sleeve 960 by using a glue (such as Loctite M-31CL). The temperature probe sleeve 960 can be glued to the internal surface of the temperature port 940. In some embodiments, the temperature probe 950 can be directly inserted into the temperature port 940 without using the temperature probe sleeve 960.

Figure 9B:
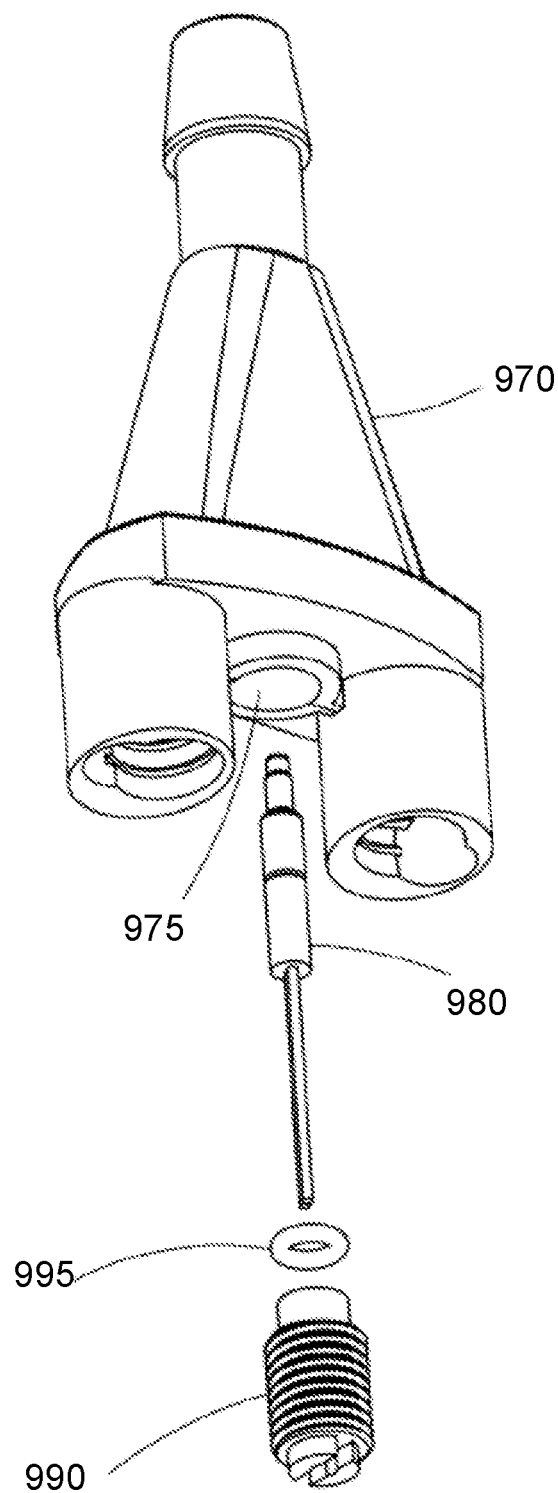
FIG. 9B illustrates another temperature probe sleeve that facilitates mounting a temperature probe onto a Y block, in accordance with an embodiment.

FIG. 9B illustrates another temperature probe sleeve 990 that facilitates mounting a temperature probe 980 onto a Y block 970, in accordance with an embodiment. The temperature probe 980 can be similar to or the same as the temperature probe 950 in FIG. 9A. The Y block 970 has a similar structure as the Y block 900 but is formed with a temperature port 975 that is internal threaded, i.e., an inner surface of the temperature port 975 is threaded.

The temperature probe sleeve 990 can be inserted into the temperature port 975. At least a portion of the outer surface of the temperature probe sleeve 990 is threaded so that the temperature probe sleeve 990 can be screwed to the Y block 970 via the temperature port 975. In some embodiments, a glue is used to assembly the temperature probe sleeve 990 on the Y block 970.

The temperature probe 980 can be installed on the Y block 970 via a channel formed in the temperature probe sleeve 990. For instance, at least a portion of the temperature probe 980 can be inserted into the Y block 970 through the channel so that the temperature probe 990 can be in contact with a fluid flowing through the Y block 970 and measure a temperature of the fluid.

An O-ring 995 is used to prevent leakage of the fluid. The O-ring 995 can be placed on top of the temperature probe sleeve 990 or inside the tip of the temperature probe sleeve 990. The O-ring 995 can avoid contamination of the fluid, e.g., contamination by the glue that is used to assemble the temperature probe sleeve 990 on the Y block 900.

Figure 10:
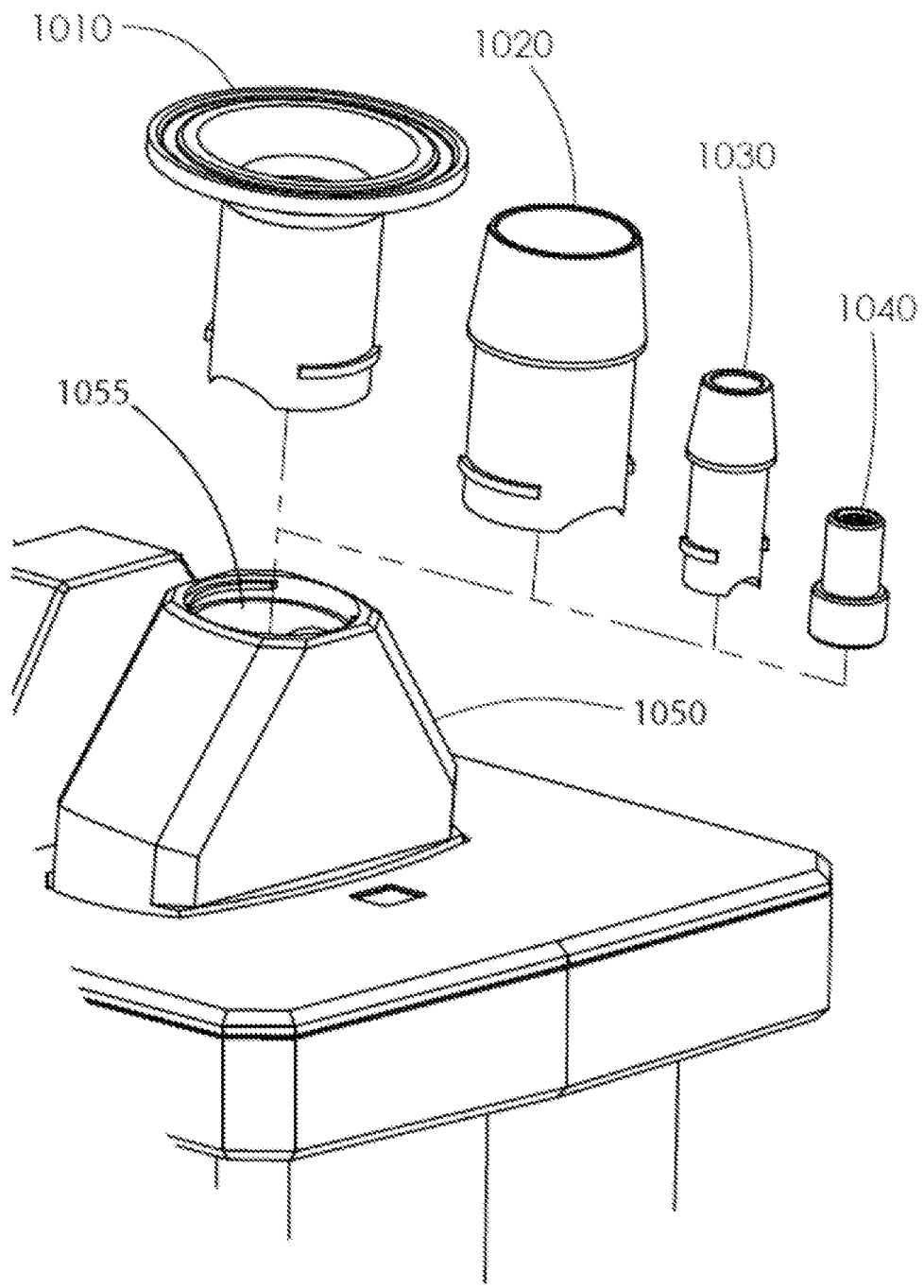
FIG. 10 illustrates example fittings for a top port of a Y block, in accordance with an embodiment.

FIG. 10 illustrates example fittings 1010, 1020, 1030, and 1040 for a top port 1055 of a Y block 1050, in accordance with an embodiment. Fittings of different shapes and sizes can be required for installing a flow sensor in different systems (e.g., biopharmaceutical and pharmaceutical skids). For example, the fitting 1010 is a tri clamp fitting. The fitting 1020 is a large size hose barb has a relatively large inner diameter, e.g., ¾ inch or 1 inch. The fitting 1030 is a smaller hose barb and has a relatively small inner diameter, such as ¼, ⅜, or ½ inch. The fitting 1040 can be a ¼-28 fitting. Each fitting can be bonded onto the inner surface of the top port 1055 of the Y block 1050 by using a glue, e.g., FDA approved Class VI epoxy (such as Loctite M-31CL).

Figure 11A:
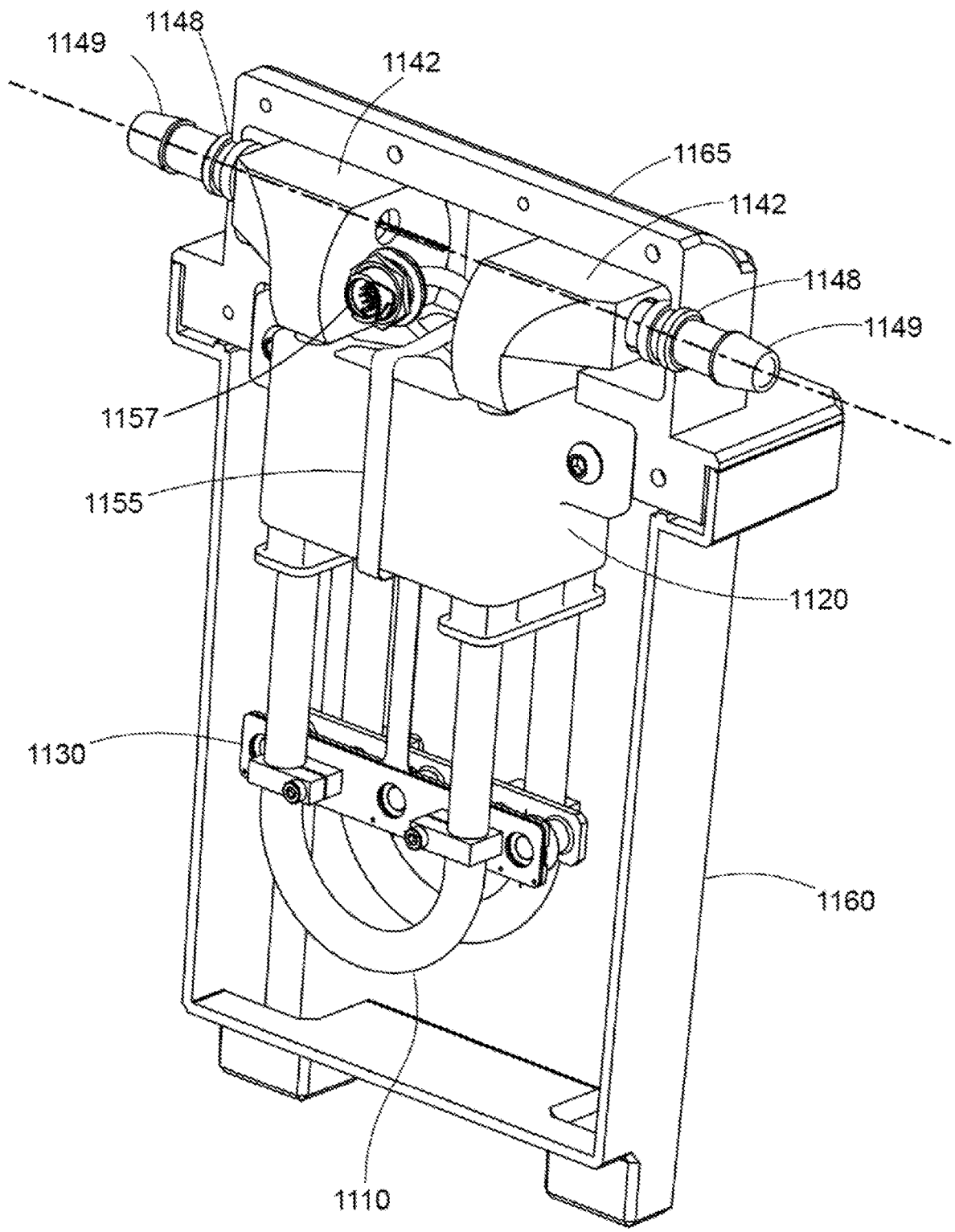
FIG. 11A illustrates another flow sensor having U-shaped flow tubes, in accordance with an embodiment.

FIG. 11A illustrates another flow sensor 1100 having U-shaped flow tubes 1100, in accordance with an embodiment. Similar to the flow sensor 100 in FIG. 1, the flow sensor 1100 includes two flow tubes 1110, a support 1120, an electromagnetic system 1130, an electronic system that includes a PCB (not shown in FIG. 11A), an interface cable 1155, and an interface connector 1157, and an enclosure assembly that includes an enclosure cup 1160 and an enclosure lid 1165.

Each of the flow tubes 1110 may have a wall thickness of more than 0.6 mm. The support 1120 may be formed around the tubular legs of the flow tubes 1110 through overmolding. As the flow tubes 1110 have walls that are thicker than 0.6 mm, the flow tubes 1110 do not deform during the over-molding process.

The flow sensor 1100 has inlet and outlet flow path assemblies. As shown in FIG. 11A, each of the inlet and outlet flow path assemblies includes an end block 1142, a barb adapter 1148, and a hose barb 1149. The end block 1142 is formed with a channel that is connected to the flow tubes 1110. The channel may have a Y shape. A fluid flows through the channel before or after it flows through the flow tubes 1110. The end block 1142 can be made from a polymer (e.g., PEEK), through machining, injection molding, or other techniques. The barb adapter 1148 is assembled on the end block 1142. For instance, the barb adapter 1148 is glued on an inner surface of the end block 1142. The hose barb 1149 is connected to the barb adapter 1148. In some embodiments, the hose barb 1149 is machined or molded as part of the barb adapter 1148, so the barb adapter 1148 and the hose barb 1149 are one integrated piece.

Figure 11C:
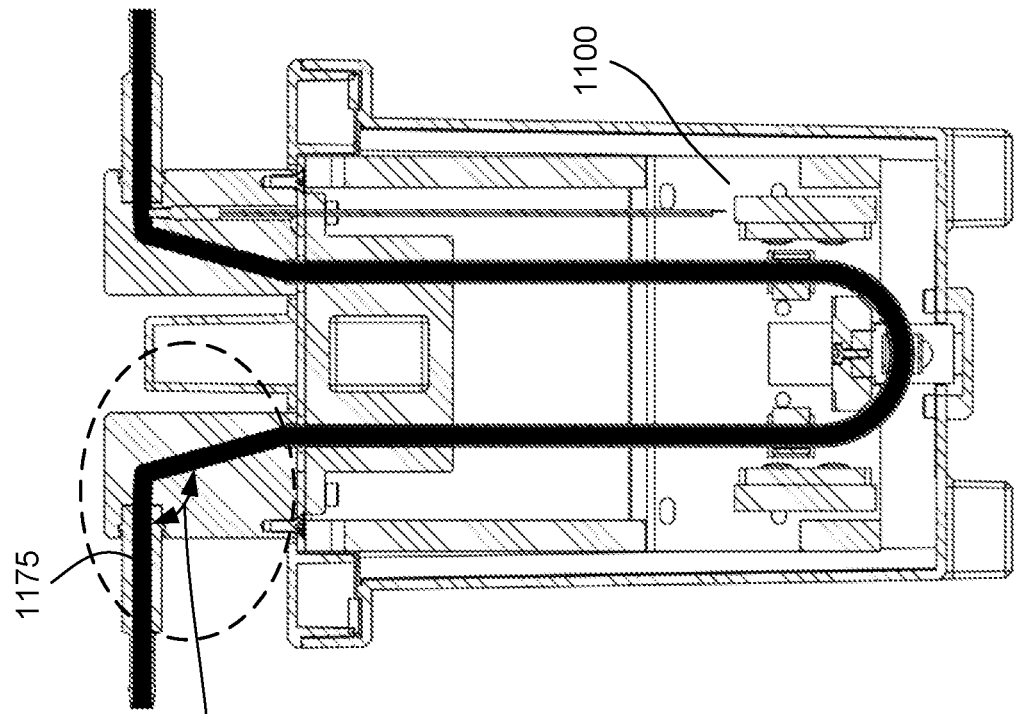
FIG. 11C shows a flow path inside an end block, in accordance with an embodiment.
Figure 11B:
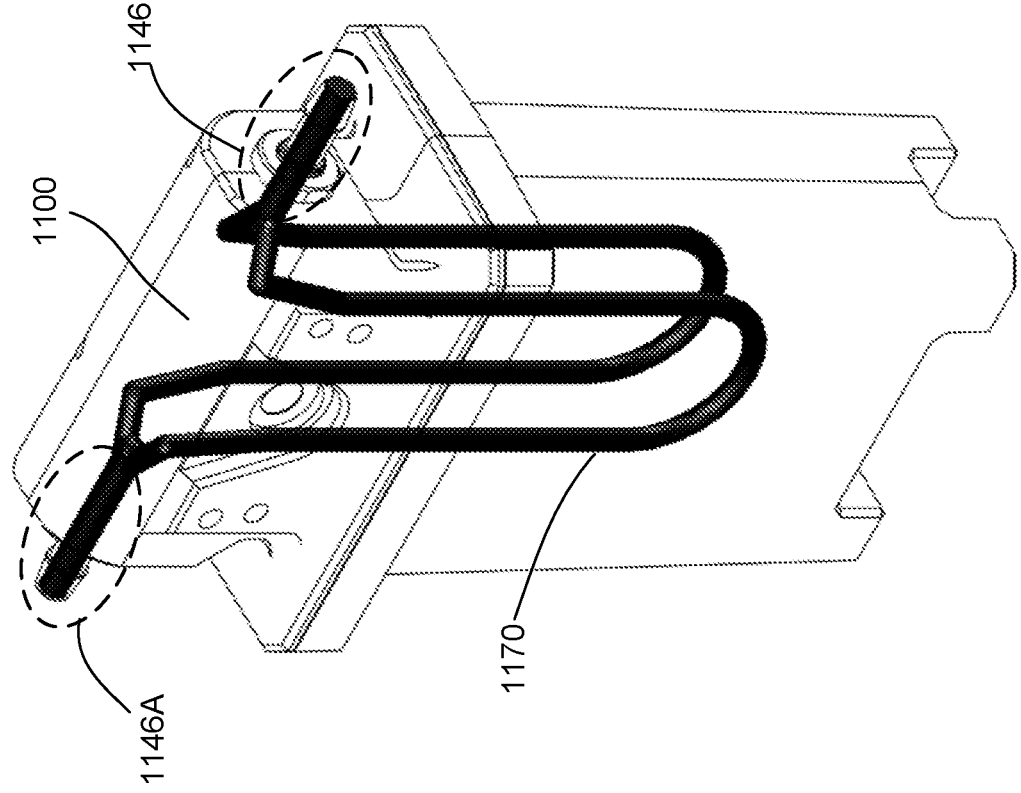
FIG. 11B illustrates a flow path in the flow sensor, in accordance with an embodiment.

In some embodiments, the inlet and outlet flow path assemblies provide a flow path that has no right angle (90°) turns. FIG. 11B illustrates a flow path 1170 in the flow sensor 1100, in accordance with an embodiment. FIG. 11C shows a flow path 1175 inside an end block 1142, in accordance with an embodiment. The flow path 1175 is part of the flow path 1170. For purpose of illustrate and simplicity, FIG. 11C does not show the whole flow path 1170 but shows a portion of the flow path 1170 that involves one of the flow tubes 1110.

The flow path 1175 has a turning angle 1180 that is larger than 90° so that the fluid going through the flow sensor 1100 does not have a right angle turn. In some embodiments, the turning angle 1180 is in a range from 90° to 175°. Right angle turns can cause high pressure drop and exert high shear force on the fluid. Such high shear force can damage matters in the fluid, such as cells, protein, virus, bacteria, etc. The design of the channel formed in the end block 1142 protects the matters in the fluid from being destructively impacted.

The inlet flow path assembly provides an inlet flow path 1146A, the outlet flow path assembly provides an outlet flow path 1146B that is colinear to the inlet flow path 1146A. A fluid enters the flow sensor 1100 through the inlet flow path, flows through the flow tubes 1110, and exits the flow sensor 1100 through the outlet flow path. For each flow path assembly, a portion of the end block 1142, the barb adapter 1148, and the hose barb 1149 are positioned along the inlet flow path or the outlet flow path and form a straight line (represented by the dash line in FIG. 11A) so that the inlet flow path and the outlet flow path are colinear to each other. With such a design, the flow sensor 1100 is suitable for a process skid including a flow path arranged in a straight line.

Figure 12:
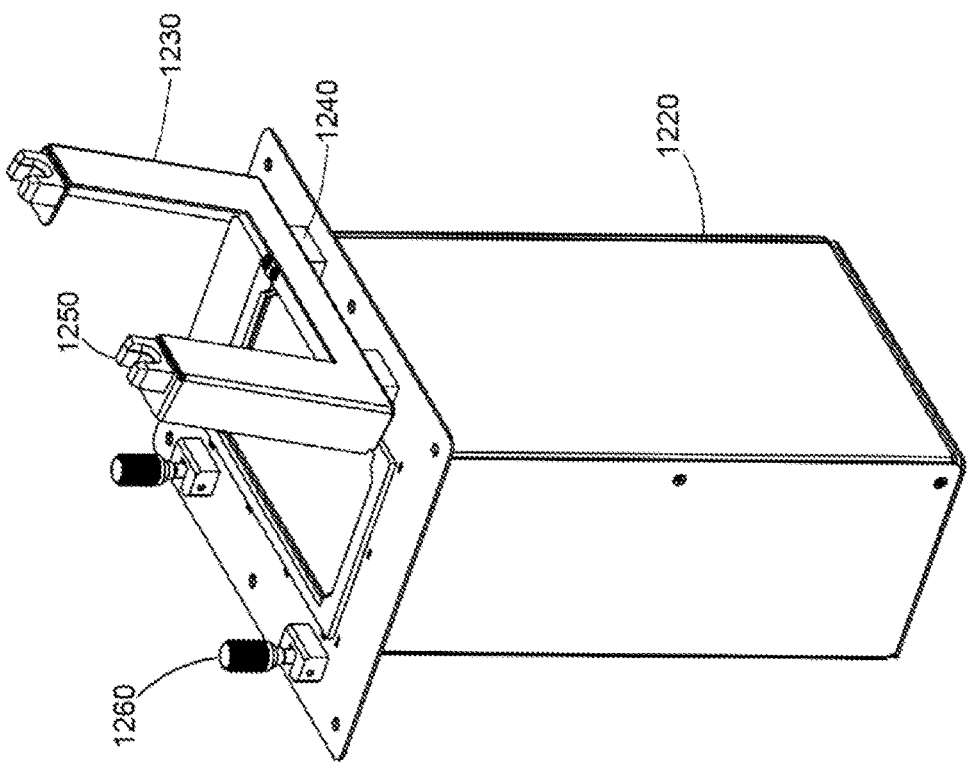
FIG. 12 illustrates a flow sensor system including a U-shaped flow tube, in accordance with an embodiment.
Figure 12:
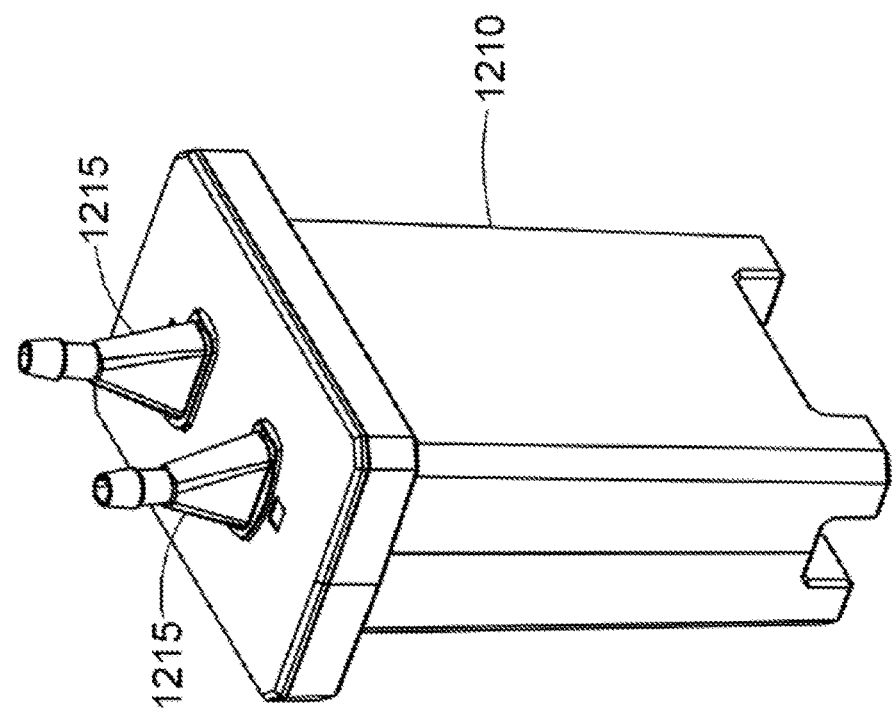

FIG. 12 illustrates a flow sensor system 1200 including a U-shaped flow tube, in accordance with an embodiment. The flow sensor system 1200 includes a flow sensor 1210 including the U-shaped flow tube (not shown in FIG. 12) and a cradle 1220 that encloses at least a portion of the flow sensor 1210. The flow sensor 1210 can be removably installed in the cradle 1220, meaning it can be removed from the cradle and another flow sensor can be installed in the cradle 1220. In applications where the flow sensor 1210 needs to be disposed after a certain amount of usage (e.g., single use), the cradle 1220 does not need to be disposed.

An embodiment of the flow sensor 1210 is the flow sensor 100 in FIG. 1. In addition to the U-shaped flow tube, the flow sensor 1210 includes two Y blocks 1215 (individually referred to as Y block 1215). The Y blocks 1215 provides channels for a fluid to enter into and exit from the flow sensor 1210. Hoses, tubing, or other types of plumbing for the fluid can be connected to the Y blocks 1215 directly. The Y blocks 1215 have different orientations from the Y-blocks in FIGS. 1 and 11 for facilitating installation of the flow sensor 1210 in a system that has a flow path not aligned in a straight line. In other embodiments, the Y blocks 1215 can have different orientations.

The cradle 1220 holds the flow sensor 1210 to maintain a position of the flow sensor during operation. Also, it minimizes or eliminates impact of external vibration (i.e., vibration other than the vibration of the U-shape flow tube) on the flow sensor 1210 to minimize zero drift during a no flow or zero flow condition. The cradle 1220 can be made by using stainless steel.

The cradle 1220 includes a latch 1230 that can be closed and opened. One or more hinges 1240 (FIG. 12 shows two) can be mounted on one side of the latch 1230 to allow a user to open and close the latch. One or more latch grips 1250 (FIG. 12 shows two) are on either side of the latch 1230. The latch 1230 can be locked by engaging the latch grips 1250 with thumb screws 1260 on the cradle 1220 to secure the flow sensor 1210 inside the cradle 1220.

A controller (not shown in FIG. 12), e.g., a flow transmitter, can be connected to the flow sensor 1210 and receives signals from the flow senor 1210 to determine mass flow rate, volumetric flow rate, and density of the fluid flowing through the flow sensor 1210 based on the received signals. The controller can also detect bubbles in the fluid based on the received signals. The controller, flow sensor 1210, cradle 1220 together can be referred to as a flow meter or flow meter system.

Even though not shown in FIG. 12, the flow sensor system 1200 can include one or more sensors for measuring characteristics of fluid other than mass flow rate, volumetric flow rate, and density, such as pressure, conductivity, pH value, dissolved Oxygen, and/or temperature. The flow sensor system 1200 can also include interconnecting fittings for installing the flow sensor system 1200 into use in a process skid or machine. For instance, the interconnecting fittings can connect the flow sensor system 1200 to a pump, e.g., a peristaltic pump, diaphragm pulsating pump or magnetic impeller pump, on one side and connect to a container (e.g., a single use tote or bag) on the other side. The pump can pump fluid from one container to another container, and the fluid can be processed and tested between the two containers, such as through bioprocessing steps like depth filtration, tangential flow filtration, chromatography, etc.

Figure 13:
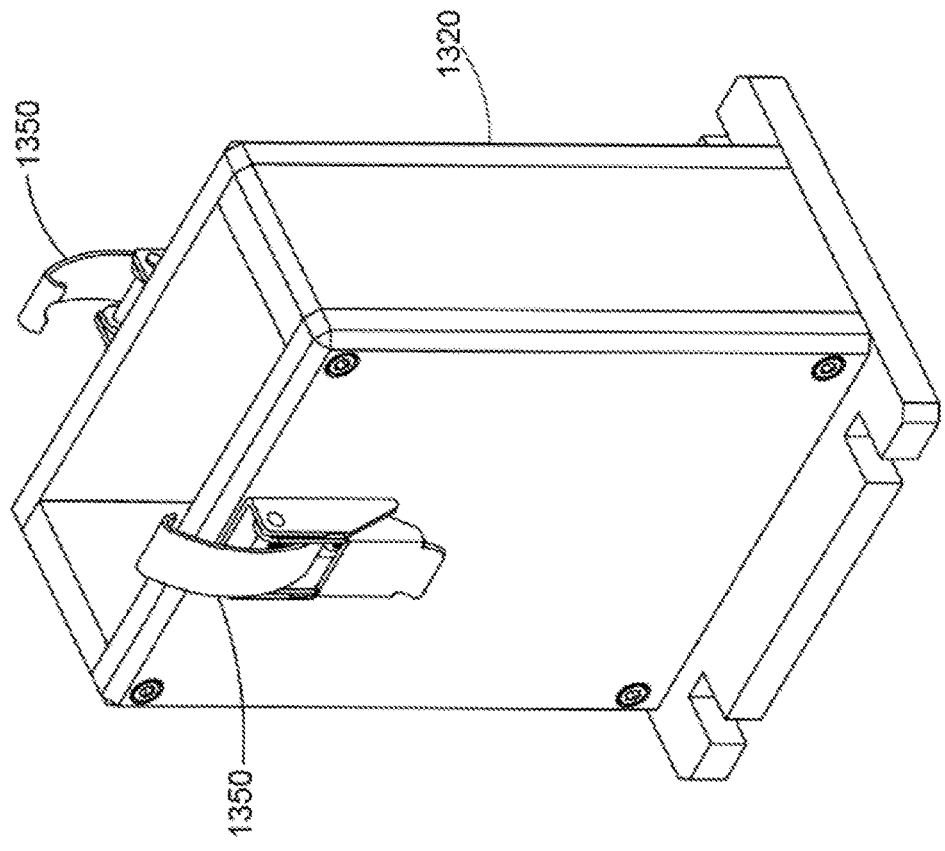
FIG. 13 illustrates another flow sensor system including a U-shaped flow tube, in accordance with an embodiment.
Figure 13:
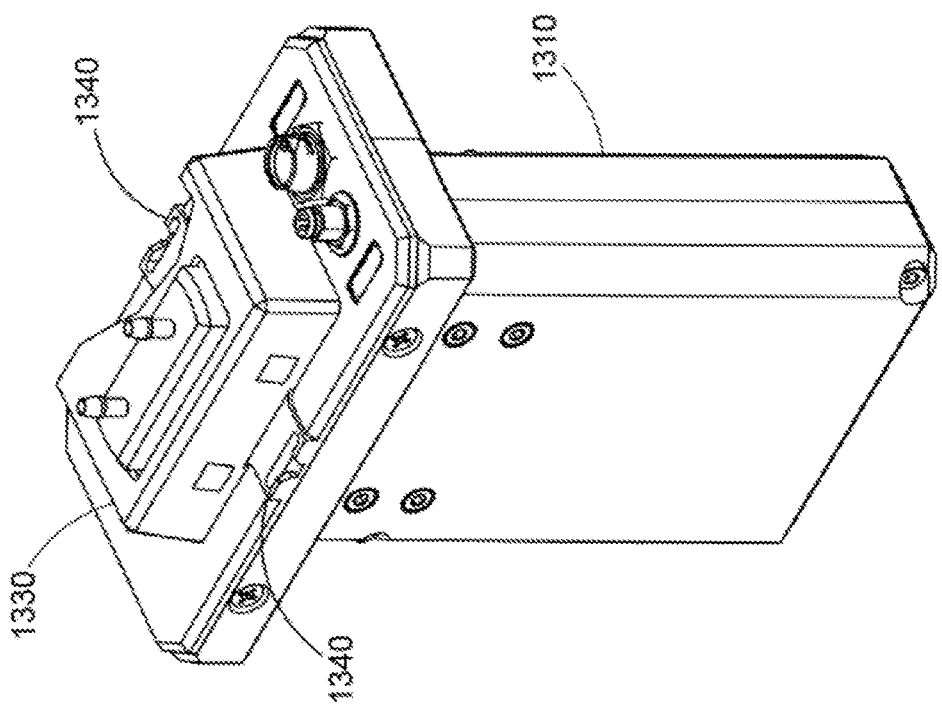

FIG. 13 illustrates another flow sensor system 1300 including a U-shaped flow tube, in accordance with an embodiment. The flow sensor system 1300 includes a flow sensor 1310 including the U-shaped flow tube and a cradle 1320. The flow sensor 1310 includes an enclosure lid 1330 formed with latch grooves 1340. FIG. 13 shows two latch grooves 1340 on the enclosure lid, but other embodiments of the flow sensor 1310 can have a different number of latch grooves.

The cradle 1320 includes two latches 1350 on its top. The latches 1350 can be engaged with and locked into the latch grooves 1340 on the enclosure lid 1330 of the flow sensor 1310 to hold the flow sensor 1310 onto the cradle 1320. The cradle 1320 can thereby maintain a position of the flow sensor 1310 during operation and minimizes or eliminates impact of external vibration on the flow sensor 1310.

Figure 14A:
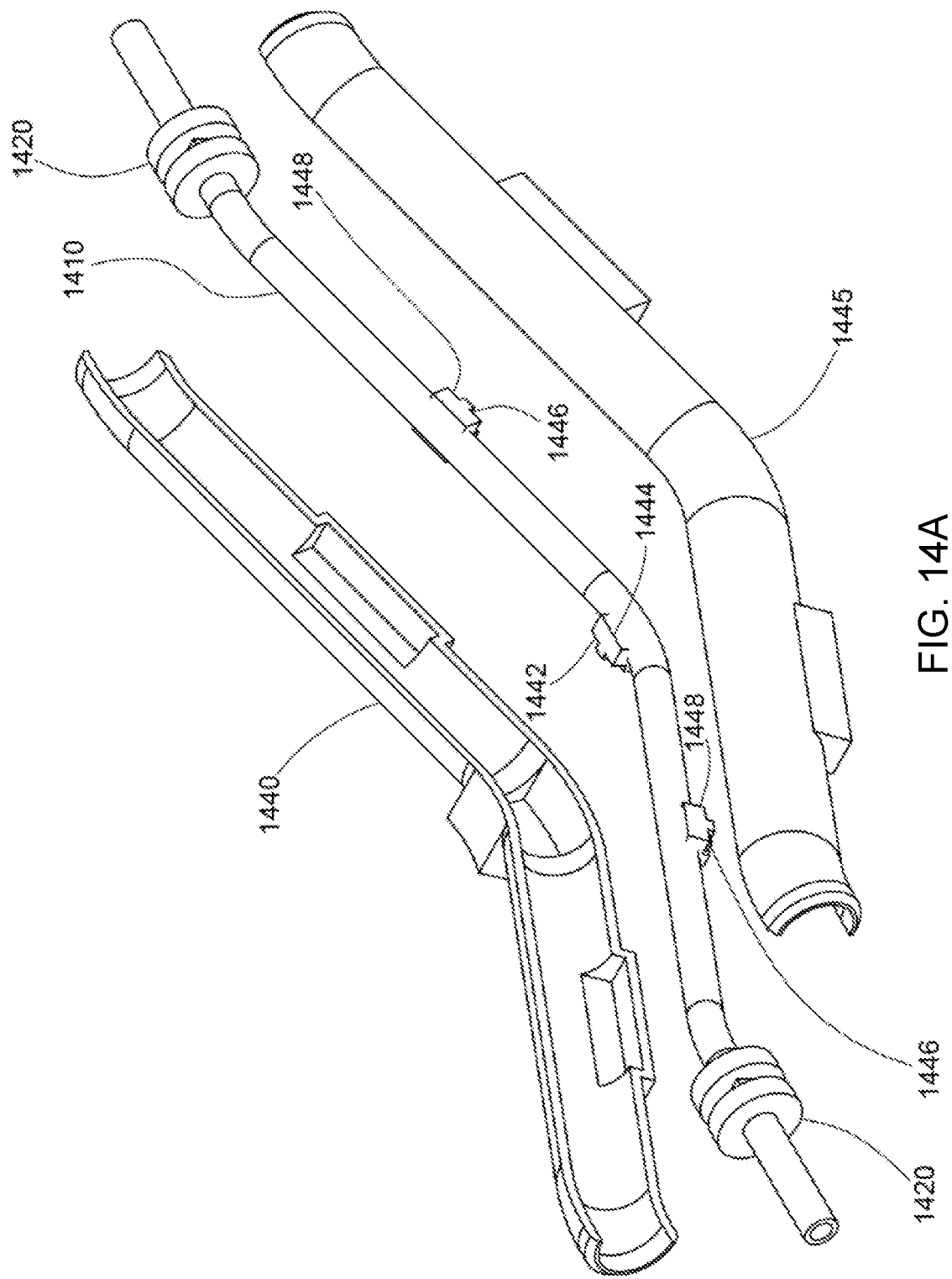
FIG. 14A illustrates a flow sensor including a V-shaped flow tube, in accordance with an embodiment.
Figure 14B:
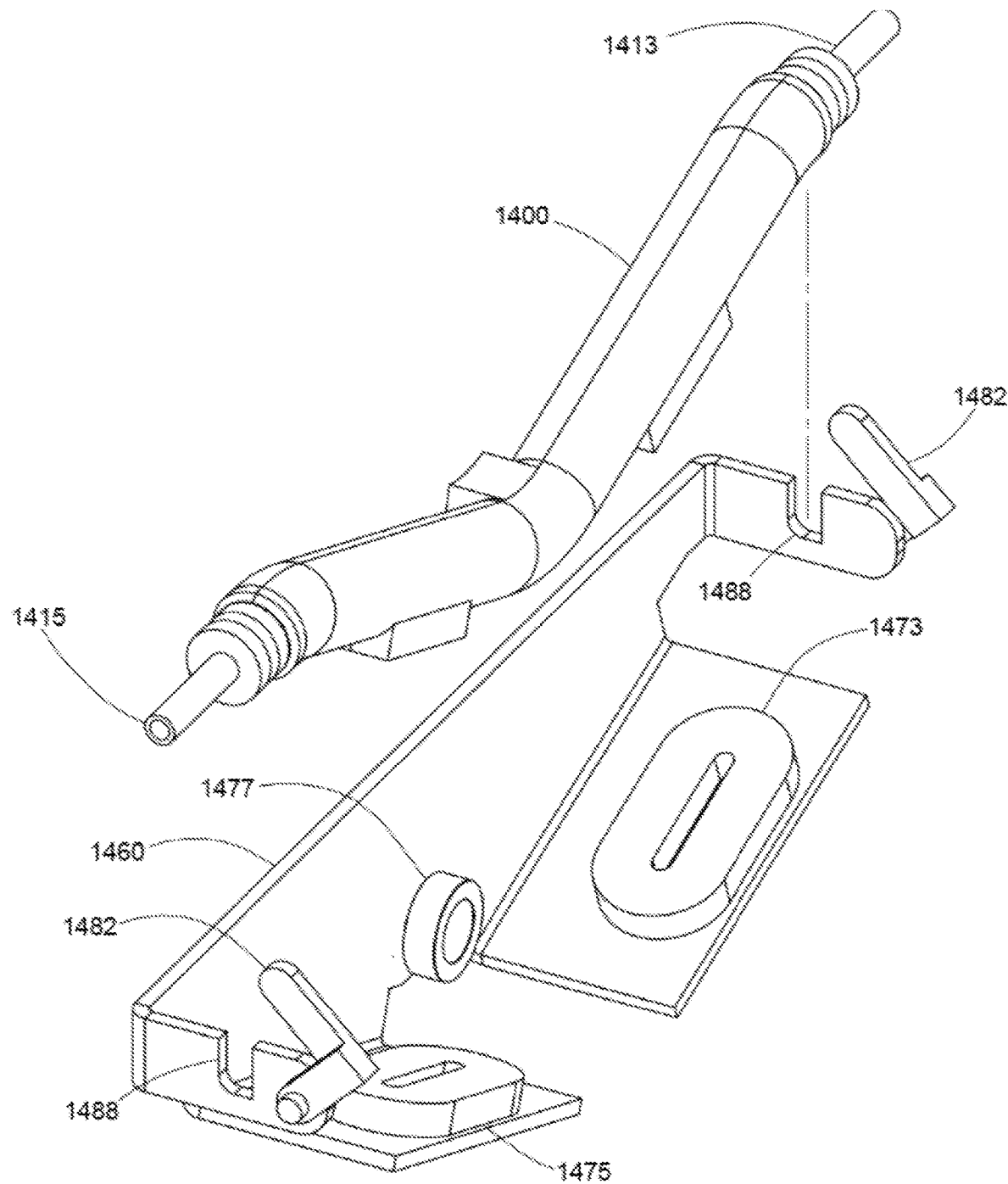
FIG. 14B illustrates a flow sensor system including the flow sensor, in accordance with an embodiment.

FIG. 14A illustrates a flow sensor 1400 including a V-shaped flow tube 1410, in accordance with an embodiment. The flow sensor 1400 also includes two supports 1420 (individually referred as "support 1420"), a magnet assembly, and an enclosure. FIG. 14B illustrates a flow sensor system 1450 including the flow sensor 1400, in accordance with an embodiment. The flow sensor system 1450 also includes a cradle 1460 where the flow sensor 1400 can be mounted.

The cradle can be made of stainless steel. The cradle 1460 maintains a position of the flow sensor 1400 and prevents impact of external vibration on the flow sensor 1400. The cradle can be made of metal, e.g., stainless steel. The cradle 1460 includes a coil assembly, which includes sense coils 1473 and 1475 and a drive coil 1477, and a locking assembly, which includes two latches 1482 and two grooves 1488.

The flow tube 1410 has a V shape. It includes two ports 1413 and 1415 at opposite ends. A fluid can enter the flow tube from one of the two ports 1413 and 1415 and exit from the other port. The fluid encounters a smaller pressure drop in the V-shaped flow tube 1410, compared with a U-shaped flow tube. The flow tube 1410 has a thin wall and small inner diameter. The thickness of the wall can be less than 1 mm, e.g., in a range from 0.05 mm to 0.60 mm. The inner diameter of the flow tube 1410 can be 0.10 mm to 0.81 mm. Such dimensions make the flow tube 1410 suitable for measuring low flow rates, e.g., flow rates from 0.05 g/min to 0.5 g/min as well as 0.5 g/min to 5 g/min. Also, the flow rate turndown of the flow sensor 1400 (i.e., the operation range of the flow sensor) can exceed 120:1, which is better than typical flow rate turndowns of 10:1 or 20:1

As shown in FIG. 14B, each of the two ports 1413 and 1415 can be locked in a groove 1488 of the locking assembly of the cradle by using a latch 1482. The locking assembly can prevent the flow tube 1410 from rotating. In some embodiments, the flow tube 1410 is fabricated by extruding a polymer (e.g., PEEK) to form a straight tube and then bending the tube into the desired V-shape.

The two supports 1420 in FIG. 14A provides structural support to the flow tube 1410. Each support 1420 has a form of a ring. Each support 1420 clamps the flow tube 1410, and the flow tube 1410 extends through the two supports 1420. The supports 1420 can be fabricated by casting around the flow tube 1410. Other fabrication techniques, e.g., injection molding, cannot form the supports 1420 without deforming the flow tube 1410. In some embodiments, the supports 1420 are identical.

The magnet assembly includes a drive magnet 1442, a drive magnet mount 1444, two sense magnets 1446, and two sense magnet mounts 1448. The drive magnet 1442 is glued onto the drive magnet mount 1444, and the sense magnets 1446 are glued to the sense magnet mounts 1448, e.g., by using Loctite M-31CL epoxy. The drive magnet mount 1444 and sense magnet mounts 1448 are attached on the flow tube 1410. The drive magnet 1442 couples with a drive coil 1477 of the coil assembly in the cradle 1460 for driving the flow tube 1410 to vibrate, e.g., at a fixed resonant frequency. The sense magnets 1446 couple with sense coils 1473 and 1475 shown in FIG. 14B to generate two electrical signals indicating change in the vibration of the flow tube 1410 due to Coriolis forces and the phase shift between the two electrical signals which corresponds to the mass fluid flow rate through the flow tube(s) 1410.

The enclosure includes two halves 1440 and 1445. It encloses a portion of the flow tube 1410, e.g., the portion between the supports 1420, and the magnet assembly. In some embodiments, the flow tube 1410, the supports 1420, and the magnet assembly (or the flow tube 1410 and the supports 1420) are integrated. For instance, they can be inserted into or removed from the enclosure as one piece. They can also be disposed as one piece after single use. In some embodiments, the flow sensor 1400 itself, including the enclosure, can be installed on or removed from the cradle 1460 as one piece and be disposed after single use.

FIG. 15 is a flow chart illustrating a process 1500 of fabricating a flow sensor, in accordance with an embodiment. A preformed flow tube is placed 1510 in a tube cavity of a mold. The flow tube can be pre-formed by extruding a polymer (e.g., PEEK) to form a tube and bending the tube to form the flow tube. The flow tube can have a U shape or V shape. A thickness of the wall of the flow tube is below 1 mm, e.g., in a range from 0.05 mm to 0.60 mm. The mold is formed with the tube cavity, a support cavity, and a gate hole (or slot). The support cavity is connected to the gate hole. The mold can also have a vent hole that facilitates flow of the liquid resin in the support cavity. An embodiment of the mold is the negative casting mold 300 described above in conjunction with FIGS. 2-5.

A liquid resin is injected 1520 into the support cavity through the gate hole. An example of the liquid resin is polyurethane thermo-setting resin. The liquid resin can be a mixture of two materials. The first material can be methylenediphenyl diisocyanate. The second material can be 4,4' Methylene bis(phenylisocyanate) or Benzene, 1,1'-methylenebis[4-isocyanato-], homopolymer.

A support is formed 1530 in the support cavity by solidifying the liquid resin. The liquid resin can be solidified by curing at temperatures, e.g., 80° C. and 100° C. The support cavity and the tube cavity are configured so that the support is formed around the flow tube. The support clamps the flow tube, and the flow tube extends through the support. A middle portion of each tubular leg of the flow tube are enclosed in the support, the rest of the tubular leg is outside the support. The support can be integrated with the flow tube so that no adhesive joints or other joints are needed. Temperature in the mold during the casting process is low, e.g., below 120° C. Also, pressure exerted on the flow tube during the casting process is low. Thus, deformation of the flow tube can be avoided.

At least one memory chip can be installed on the flow sensor to store calibration information. The calibration information includes a plurality of calibration factors. Each calibration factor can be determined by flowing a fluid through the flow sensor and obtaining a flow rate of the fluid measured by the flow sensor. The calibration factor is determined based on a reference flow rate and the measured flow rate. For instance, the calibration factor is a ratio of the reference flow rate to the measured flow rate. The reference flow rate can be a flow rate of the fluid measured by a reference flow meter or measured by using a gravimetric method. Accuracy of the measured flow rate can be at least +/−0.25% of the reference flow rate.

After the calibration information is determined and stored, the flow sensor is cleaned, e.g., it can be flushed with WFI (Water For Injection) and sterilized with Gamma irradiation. The fabrication, calibration, and cleaning processes can be completed inside a Class 6 or 7 Cleanroom. After the cleaning process completes, plastic protective caps are placed on the inlet and outlet ports of the flow sensor. It is then sealed in double bags so as to prevent any air borne bacteria from entering into the flow sensor. These bags are opened after the flow sensor is delivered to a user who will install the flow sensor, e.g., in a process skid or a process system residing in a sterile environment. The user can connect interface connectors and/or interface cables on the flow sensor to another device, e.g., a controller. The controller can read out the calibration information from the memory chip for adjusting flow rates measured by the flow sensor. The flow sensor can be removed and disposed after single use.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A Coriolis mass flow sensor comprising:
   a flow tube including one or more tubular legs, the flow tube formed of a polymer material;
   a support molded around the one or more tubular legs of the flow tube, the one or more tubular legs extending through the support;
   a plastic enclosure that encloses and surrounds the flow tube and support; and
   an enclosure lid arranged to removably couple with a mating surface of the plastic enclosure,
   wherein the plastic enclosure is configured to be removably installed in a cradle.

2. The Coriolis mass flow sensor of claim 1, wherein the support is attached to the enclosure lid such that the support and flow tube are removed from within the plastic enclosure when the enclosure lid is removed from the plastic enclosure.

3. The Coriolis mass flow sensor of claim 1 comprising a second flow tube including one or more tubular legs, the second flow tube formed from a polymer material,
   wherein the flow tube is a first flow tube, and the support is molded around the one or more tubular legs of the first flow tube and the one or more tubular legs of the second flow tube.

4. The Coriolis mass flow sensor of claim 3 comprising:
   an inlet end block comprising a Y shaped channel within the inlet end block, the inlet end block in fluid communication with the first flow tube and the second flow tube; and
   an outlet end block comprising a Y shaped channel within the outlet end block, the outlet end block in fluid communication with the first flow tube and the second flow tube.

5. The Coriolis mass flow sensor of claim 4, wherein the inlet end block and the outlet end block are housed within the enclosure lid.

6. The Coriolis mass flow sensor of claim 4, wherein an inlet flow path of the inlet end block and an outlet flow path of the outlet end block are collinear with one another, and
   wherein all angles that change a direction of flow within the inlet end block channel and the outlet end block channel are greater than 90°.

7. The Coriolis mass flow sensor of claim 3 comprising:
   a Y block in fluid communication with the first flow tube and the second flow tube, the Y block having a top port and two bottom ports, a first bottom port bonded to one of the tubular legs of the first flow tube and a second bottom port bonded to one of the tubular legs of the second flow tube, wherein the Y block extends outward from the enclosure lid and forms an angle with an upper surface of the enclosure lid; and
   a tubing elbow configured to connect to the top port of the Y block, wherein the tubing elbow forms an angle larger than 90°.

8. The Coriolis mass flow sensor of claim 7 comprising a temperature probe installed within the Y block.

9. The Coriolis mass flow sensor of claim 1 comprising:
   an inlet assembly in fluid communication with the flow tube and extending through the enclosure lid, the inlet assembly configured to provide an inlet flow path; and
   an outlet assembly in fluid communication with the flow tube and extending through the enclosure lid, the outlet assembly configured to provide an outlet flow path,
   wherein the inlet flow path and outlet flow path are collinear with one another.

10. The Coriolis mass flow sensor of claim 1, wherein a thickness of a wall of the flow tube is in a range from 0.05 mm to 0.60 mm.

11. The Coriolis mass flow sensor of claim 1, wherein the flow tube has a U shape, the flow tube has two tubular legs, and the support clamps the two tubular legs.

12. The Coriolis mass flow sensor of claim 1, wherein a ratio of a thickness of a wall of the flow tube to an inner diameter of the flow tube is no more than 35%.

13. A method comprising:
    obtaining a Coriolis mass flow sensor comprising:

a flow tube including one or more tubular legs, the flow tube formed of a polymer material;

a support molded around the one or more tubular legs of the flow tube, the one or more tubular legs extending through the support;

a plastic enclosure that encloses and surrounds the flow tube and support, wherein the plastic enclosure is configured to be removably installed in a cradle; and an enclosure lid arranged to removably couple with a mating surface of the plastic enclosure;

sterilizing the Coriolis mass flow sensor by using Gamma irradiation;

determining a plurality of calibration factors of the Coriolis mass flow sensor; and storing the calibration factors in a memory chip on the Coriolis mass flow sensor.

14. A flow sensor system comprising:
a Coriolis mass flow sensor comprising:
   a flow tube including one or more tubular legs, the flow tube formed of a polymer material;
   a support molded around the one or more tubular legs of the flow tube, the one or more tubular legs extending through the support;
   a plastic enclosure that encloses and surrounds the flow tube and support; and
   an enclosure lid arranged to removably couple with a mating surface of the plastic enclosure; and
a cradle configured to receive the plastic enclosure.

15. The Coriolis mass flow sensor of claim 14, wherein the support is attached to the enclosure lid such that the support and flow tube are removed from within the plastic enclosure when the enclosure lid is removed from the plastic enclosure.

16. The Coriolis mass flow sensor of claim 14 comprising a second flow tube including one or more tubular legs, the second flow tube formed from a polymer material,
   wherein the flow tube is a first flow tube, and the support is molded around the one or more tubular legs of the first flow tube and the one or more tubular legs of the second flow tube.

17. The Coriolis mass flow sensor of claim 16 comprising:
an inlet end block comprising a Y shaped channel within the inlet end block, the inlet end block in fluid communication with the first flow tube and the second flow tube; and
an outlet end block comprising a Y shaped channel within the outlet end block, the outlet end block in fluid communication with the first flow tube and the second flow tube.

18. The Coriolis mass flow sensor of claim 17, wherein the inlet end block and the outlet end block are housed within the enclosure lid.

19. The Coriolis mass flow sensor of claim 17, wherein an inlet flow path of the inlet end block and an outlet flow path of the outlet end block are collinear with one another, and
   wherein all angles that change a direction of flow within the inlet end block channel and the outlet end block channel are greater than 90°.

20. The Coriolis mass flow sensor of claim 16 comprising:
a Y block in fluid communication with the first flow tube and the second flow tube, the Y block having a top port and two bottom ports, a first bottom port bonded to one of the tubular legs of the first flow tube and a second bottom port bonded to one of the tubular legs of the second flow tube, wherein the Y block extends outward from the enclosure lid and forms an angle with an upper surface of the enclosure lid; and
a tubing elbow configured to connect to the top port of the Y block, wherein the tubing elbow forms an angle larger than 90°.

21. The Coriolis mass flow sensor of claim 20 comprising a temperature probe installed within the Y block.

22. The Coriolis mass flow sensor of claim 14 comprising:
an inlet assembly in fluid communication with the flow tube and extending through the enclosure lid; the inlet assembly configured to provide an inlet flow path; and
an outlet assembly in fluid communication with the flow tube and extending through the enclosure lid, the outlet assembly configured to provide an outlet flow path,
wherein the inlet flow path and outlet flow path are collinear with one another.

23. The Coriolis mass flow sensor of claim 14, wherein a thickness of a wall of the flow tube is in a range from 0.05 mm to 0.60 mm.

24. The Coriolis mass flow sensor of claim 14, wherein the flow tube has a U shape, the flow tube has two tubular legs, and the support clamps the two tubular legs.

25. The Coriolis mass flow sensor of claim 14, wherein a ratio of a thickness of a wall of the flow tube to an inner diameter of the flow tube is no more than 35%.

* * * * *